(12) United States Patent
Baker et al.

(10) Patent No.: US 6,425,267 B1
(45) Date of Patent: Jul. 30, 2002

(54) TWO-STEP PROCESS FOR NITROGEN REMOVAL FROM NATURAL GAS

(75) Inventors: Richard W. Baker, Palo Alto; Kaaeid A. Lokhandwala, Union City; Johannes G. Wijmans, Menlo Park; Andre R. Da Costa, Palo Alto, all of CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 0 days.

(21) Appl. No.: 09/917,478

(22) Filed: Jul. 27, 2001

(51) Int. Cl.$^7$ ............................. F25J 1/00; B01D 53/22
(52) U.S. Cl. ............................. 62/624; 62/927; 95/47; 95/50
(58) Field of Search ...................... 62/624, 927; 95/45, 95/47, 50

(56) References Cited

U.S. PATENT DOCUMENTS

| | | | |
|---|---|---|---|
| 4,717,407 A | * | 1/1988 | Choe et al. ............... 62/624 |
| 5,032,148 A | * | 7/1991 | Baker et al. ............... 62/624 |
| 5,071,451 A | | 12/1991 | Wijmans ................... 55/16 |
| 5,281,255 A | | 1/1994 | Toy et al. .................. 95/50 |
| 5,332,424 A | * | 7/1994 | Rao et al. .................. 62/624 |
| 5,647,227 A | | 7/1997 | Lokhandwala ........... 62/624 |
| 5,669,958 A | | 9/1997 | Baker et al. ............... 95/50 |
| 5,707,423 A | | 1/1998 | Pinnau et al. ............. 95/45 |

OTHER PUBLICATIONS

Gottschlich et al., "Energy Minimization of Separation Processes using Conventional Membrane/Hybrid Systems," Final Report to DOE, 1990.
Tanaka et al., "Permeability and Permselectivity of Gases in Fluorinated and Non–Fluorinated Polyimides," Polymer, vol. 33, p 585, 1992.
Stern et al., "Structure–Permeability Relationships in Silicone Polymers," J. Polymer Sci., vol. 25, p 1263, 1987.
Kim et al., Relationship Between Gas Separation Properties and Chemical Structure in a Series of Aromatic Polyimides, J. Memb. Sci., vol. 37, p 45, 1988.

* cited by examiner

Primary Examiner—Ronald Capossela
(74) Attorney, Agent, or Firm—J. Farrant

(57) ABSTRACT

A process for treating natural gas or other methane-rich gas to remove excess nitrogen. The invention relies on membrane separation using methane-selective membranes, but does not require the membranes to be operated at very low temperatures. We have found that, by using a two-step membrane system design, and controlling the operating pressures for the membrane steps within certain ranges, the capital and operating costs of the process can be kept within economically acceptable limits.

77 Claims, 10 Drawing Sheets

TWO-STEP PROCESS FOR NITROGEN REMOVAL FROM NATURAL GAS

FIELD OF THE INVENTION

The invention relates to the treatment of nitrogen-laden natural gas. More particularly, the invention relates to the removal of nitrogen from such natural gas by means of gas-separation membranes.

BACKGROUND OF THE INVENTION

Fourteen percent of known U.S. natural gas reserves contain more than 4% nitrogen. Many of these reserves cannot be exploited because no economical technology for removing the nitrogen exists.

Cryogenic distillation is the only process that has been used to date on any scale to remove nitrogen from natural gas. The gas streams that have been treated by cryogenic distillation, for example streams from enhanced oil recovery, have large flow rates and high nitrogen concentration, such as more than 10 vol %. Cryogenic plants can be cost-effective in these applications because all the separated products have value. The propane, butane and heavier hydrocarbons can be recovered as natural gas liquids (NGL), the methane/ethane stream can be delivered to the gas pipeline and the nitrogen can be reinjected into the formation.

Cryogenic plants are not used more widely because they are costly and complicated. A particular complication is the need for significant pretreatment to remove water vapor, carbon dioxide and $C_{3+}$ hydrocarbons and aromatics to avoid freezing of these components in the cryogenic section of the plant, which typically operates at temperatures down to −150° C. The degree of pretreatment is often far more elaborate and the demands placed upon it are far more stringent than would be required to render the gas acceptable in the pipeline absent the excess nitrogen content. For example, pipeline specification for water vapor is generally about 120 ppm; to be fit to enter a cryogenic plant, the gas must contain no more than 1–2 ppm of water vapor at most. Similarly, 2% carbon dioxide content may pass muster in the pipeline, whereas carbon dioxide must be present at levels no higher than about 100 ppm for cryogenic separation. For streams of flow rates less than about 50–100 MMscfd, therefore, cryogenic technology is simply too expensive and impractical for use.

Other processes that have been considered for performing this separation include pressure swing adsorption and lean oil absorption; none is believed to be in regular industrial use.

Gas separation by means of membrane is known. For example, numerous patents describe membranes and membrane processes for separating oxygen or nitrogen from air, hydrogen from various gas streams and carbon dioxide from natural gas. Such processes are in industrial use, using glassy polymeric membranes. Rubbery polymeric membranes are used to separate organic components from air or other gas mixtures.

A report by SRI to the U.S. Department of Energy ("Energy Minimization of Separation Processes using Conventional Membrane/Hybrid Systems", D. E. Gottschlich et al., final report under contract number DE 91-004710, 1990) suggests that separation of nitrogen from methane might be achieved by a hybrid membrane/pressure swing adsorption system. The report shows and considers several designs, assuming that a hypothetical nitrogen-selective membrane, with a selectivity for nitrogen over methane of 5 and a trans membrane methane flux of $1 \times 10^{-6}$ cm$^3$(STP)/cm$^2$·s·cmHg, were to become available, which to date it has not.

In fact, both glassy and rubbery membranes have poor selectivities for nitrogen over methane or methane over nitrogen. Table 1 lists some representative values.

TABLE 1

| Polymer | Permeability (Barrer) | | Selectivity (−) | | Ref. |
| --- | --- | --- | --- | --- | --- |
| | $N_2$ | $CH_4$ | $N_2/CH_4$ | $CH_4/N_2$ | |
| Polyimide (6FDA-mp'ODA) | 0.26 | 0.13 | 2.1 | 0.5 | 1 |
| Polyimide (6FDA-BAHF) | 3.10 | 1.34 | 2.3 | 0.4 | 1 |
| Polyimide (6FDA-IPDA) | 1.34 | 0.70 | 1.9 | 0.5 | 2 |
| Polyimide (6FDA-MDA) | 0.20 | 0.10 | 2.0 | 0.5 | 2 |
| Cellulose acetate | 0.35 | 0.43 | 0.8 | 1.2 | 3 |
| Polycarbonate | 0.37 | 0.45 | 0.8 | 1.2 | 3 |
| Polysulfone | 0.14 | 0.23 | 0.6 | 1.7 | 3 |
| Poly(dimethylsiloxane-dimethylstyrene) | 103 | 335 | 0.3 | 3.3 | 3 |
| Poly(dimethylsiloxane) | 230 | 760 | 0.3 | 3.3 | 3 |
| Poly(siloctylene-siloxane) | 91 | 360 | 0.25 | 4.0 | 4 |
| Poly(silphenylene-siloxane) | 3 | 12 | 0.25 | 4 | 4 |
| Polyamide-polyether block copolymer | 4.8 | 20 | 0.24 | 4.2 | 3 |

1. K. Tanaka et al., "Permeability and Permselectivity of Gases in Fluorinated and Non-Fluorinated Polyimides", Polymer 33, 585 (1992).
2. T. H. Kim et al., "Relationship Between Gas Separation Properties and Chemical Structures in a Series of Aromatic Polyimides", J. Memb. Sci., 37, 45 (1988).
3. J. G. Wijmans, "Membrane Processes and Apparatus for Removing Vapors from Gas Streams", U.S. Pat. No. 5,071,451 (December 1991).
4. S. A. Stern et al., "Structure Permeability Relationships in Silicone Polymers", J. Polymer Sci: Polymer Physics Ed. 25, 1263 (1987).

These separation properties are not good enough to make methane/nitrogen separation by membrane practical, either by preferentially permeating the nitrogen or by preferentially permeating the methane.

The problem of separating gas mixtures containing methane and nitrogen into a methane-rich stream and a nitrogen-rich stream is, therefore, a very difficult one, owing to the low selectivity of essentially all membrane materials to these gases. However, it was discovered a few years ago that operating silicone rubber membranes at low temperatures can increase the methane/nitrogen selectivity to as high as 5, 6 or above. U.S. Pat. Nos. 5,669,958 and 5,647,227 make use of this discovery and disclose low-temperature methane/nitrogen separation processes using silicone rubber or similar membranes to preferentially permeate methane and reject nitrogen. However, such a selectivity is obtained only at very low temperatures, typically −60° C., for example. Temperatures this low generally cannot be reached by relying on the Joule-Thomson effect to cool the membrane permeate and residue streams, but necessitate additional chilling by means of external refrigeration. While such processes may be workable in industrial facilities with ready access to refrigeration plants, they are impractical in many gas fields, where equipment must be simple, robust and able to function for long periods without operator attention.

Another problem of very low temperature operation is that, even though the membranes themselves may withstand the presence of liquid water and hydrocarbons, considerable pretreatment is often necessary to avoid damage to ancillary equipment by condensed liquids. Streams must also be dried to a very low water content to prevent the formation of methane or other hydrocarbon hydrates that can clog the system.

Yet another problem of very low temperature operation is that equipment components must be made from comparatively expensive stainless steel or other special steels, rather than lower cost carbon steels.

Further concerns that hamper membrane process design for methane/nitrogen separation are that vacuum pumps generally must not be used anywhere in the system as they may permit air to leak into lines carrying hydrocarbon mixtures, representing an unacceptable safety hazard. Indeed, for safety, reliability and cost-containment, the number of pieces of rotating or moving equipment of any kind should be kept to a minimum.

In view of these multiple difficulties, there remains an unsatisfied need for economical means of exploiting nitrogen-rich natural gas reserves, especially those contained in gas fields with smaller flow rates.

SUMMARY OF THE INVENTION

The invention is a process for treating natural gas or other methane-rich gas to remove excess nitrogen, thereby producing one, two or three product streams of value. The invention relies on membrane separation using methane-selective membranes, but does not require the membranes to be operated at very low temperatures. We have found that, by using a two-step membrane system design, and optionally controlling the operating parameters for the membrane steps within certain ranges, the capital and operating costs of the process can be kept within economically acceptable limits.

Two basic process configurations can be used, depending on the pressure of the raw gas to be treated by the process. If the raw gas is already at comparatively high pressure, the invention includes the following steps:

(a) providing a first membrane unit containing a first membrane having a first feed side and a first permeate side, the first membrane being more permeable to methane than to nitrogen;

(b) providing a second membrane unit containing a second membrane having a second feed side and a second permeate side, the second membrane being more permeable to methane than to nitrogen, the second membrane unit being connected in series with the first membrane unit such that gas leaving the first feed side can enter the second membrane unit on the second feed side;

(c) passing a gas stream, comprising methane and at least about 4% nitrogen, at a first pressure, and at a first temperature higher than about −40° C., into the first membrane unit at a first inlet of the first feed side;

(d) withdrawing from a first outlet of the first feed side a first residue stream enriched in nitrogen compared with the gas stream;

(e) withdrawing from the first permeate side as a first product stream, at a second pressure lower than the first pressure, a first permeate stream depleted in nitrogen compared with the gas stream;

(f) passing the first residue stream, at a second temperature, into the second membrane unit at a second inlet of the second feed side;

(g) withdrawing from a second outlet of the second feed side a second residue stream enriched in nitrogen compared with the first residue stream;

(h) withdrawing from the second permeate side, at a third pressure lower than the first pressure, a second permeate stream depleted in nitrogen compared with the first residue stream.

If the raw gas is at comparatively low pressure, the invention includes the following steps:

(a) compressing a gas stream comprising methane and at least about 4% nitrogen to a first pressure in the range 400–1,500 psia to form a compressed gas stream;

(b) providing a first membrane unit containing a first membrane having a first feed side and a first permeate side, the first membrane being more permeable to methane than to nitrogen;

(c) providing a second membrane unit containing a second membrane having a second feed side and a second permeate side, the second membrane being more permeable to methane than to nitrogen, the second membrane unit being connected in series with the first membrane unit such that gas leaving the first feed side can enter the second membrane unit on the second feed side;

(d) introducing the compressed gas stream at a first temperature higher than about −40° C. into the first membrane unit at a first inlet of the first feed side, and passing the compressed gas stream across the first feed side;

(e) withdrawing from a first outlet of the first feed side a first residue stream enriched in nitrogen compared with the gas stream;

(f) withdrawing from the first permeate side as a first product stream, at a second pressure lower than the first pressure and above about 25 psia, a first permeate stream depleted in nitrogen compared with the gas stream;

(g) introducing the first residue stream into the second membrane unit at a second inlet of the second feed side, and passing the first residue stream across the second feed side;

(h) withdrawing from a second outlet of the second feed side a second residue stream enriched in nitrogen compared with the first residue stream;

(i) withdrawing from the second permeate side, at a third pressure lower than the first pressure and above about 25 psia, a second permeate stream depleted in nitrogen compared with the first residue stream.

Preferred embodiments of the invention, depending on the feed gas composition, include either recirculating the second permeate stream to the front of the process to increase methane recovery, or withdrawing the second permeate stream as a second product stream, specifically for use as fuel to run the compressor or other field equipment.

The second residue stream is usually flared, used as fuel or reinjected. As a preferred alternative, it is possible to include a third, smaller membrane separation step to treat the second residue stream by fractionating it into a comparatively methane-rich permeate stream, which may optionally be used as engine fuel to drive the compressor, and a comparatively nitrogen-rich residue stream, which may be flared or reinjected, for example.

By adopting one of these preferred embodiments, the fuel to run any compressor needed for the process can be generated as a discrete product stream by the process itself. This is very beneficial as gas-fired compressors can operate in remote locations where an electrical power supply is unavailable.

The process of the invention offers a number of additional features and advantages. Most importantly, it enables natural gas containing relatively large amounts of nitrogen, such as 10%, 20% or higher, to be brought close to or within pipeline specification of no more than 4% nitrogen. Furthermore, for small gas streams or remote gas fields, these results can be achieved more simply, reliably and cheaply than could be done with prior art technology.

Also, unlike the prior art membrane processes disclosed in U.S. Pat. Nos. 5,669,958 and 5,647,227, it is not necessary to operate the membrane separation steps under conditions of such low temperature as to yield a methane/nitrogen selectivity of at least 5. The two-step membrane process configuration, optionally combined with operation in an optimum pressure range, provides adequate performance, in terms of low product nitrogen content combined with good methane recovery, even when the membrane selectivity is as low as 2, 3 or 4, for example. Sufficient cooling to produce adequate selectivity can, therefore, be provided in most cases simply by taking advantage of the cooling by Joule-Thomson effect of both permeate and residue streams that takes place in membrane separation processes.

This effect is discussed at length in, for example, U.S. Pat. No. 5,762,685. The feed and permeate sides of a membrane are separated only by the very thin polymer membrane layer and are in good thermal contact. Thus, although it is expansion to the permeate side that produces the cooling, membrane separation of a gas stream containing organic components typically results in the residue stream, as well as the permeate, being significantly colder than the gas that was fed to the membrane. In experimental tests, we have found in some cases that the residue and permeate streams are at about the same temperature; in other cases we have found that the residue stream is the colder. Either the residue or the permeate, or both, can, therefore, be used to cool the incoming gas.

Such cooling can be accomplished by heat exchange between the membrane feed, residue and permeate streams, and optionally by expanding the membrane residue stream before such heat exchange, without the need for any external refrigeration source. In general, the process can be operated at temperatures above −40° C., and often much higher, such as above −30° C., above −25° C., above −10° C. or even around 0° C. or above. The ability to function at these comparatively high temperatures and without external cooling in many instances is a particular advantage of the present invention, as it greatly simplifies the process compared with prior art technologies.

The most important product of the process is the methane-rich, nitrogen-depleted permeate stream, which must frequently meet a specification of no more than about 4% nitrogen. Since a controlled permeate composition is a key target of the process, it is conventional in the membrane separation arts to achieve this composition, if it cannot be reached in a single membrane-separation stage, by using a two- or multi-stage configuration, in which the inadequately enriched permeate from the first stage is passed, often after recompression, as feed to a second membrane separation stage, and so on, until the desired composition has been achieved.

In contrast, the process of the invention relies on two or more membranes steps, rather than two or more membrane stages, to reach a permeate composition of desired enrichment of methane and depletion of nitrogen. For this reason, it is generally possible to use only one compression step in the process. This is very advantageous, as it enhances reliability and acceptability in the field, and can result in cost and energy savings.

Furthermore, very high pressures are not needed for good performance. Rather, we have discovered that the capital costs of the equipment and the compressor horse power required to perform the process both tend to pass through minimum values when the feed gas pressure to the first membrane separation step is between about 400 psia and 1,500 psia.

If desired, the process can be operated so as to keep the average temperatures of the membrane separation units and incoming and outgoing streams above about −25° C. In this case, metal components of the equipment can be made from carbon steel rather than stainless steel, with considerable cost savings.

A final advantage is that the membranes can operate in the presence of water, carbon dioxide and $C_{3+}$ hydrocarbons, all of which are almost always present in natural gas to some extent. These components have no adverse effects on the membranes, but simply pass into the permeate stream along with the methane, even if the membrane separation is performed at conditions close to the water or hydrocarbon dewpoints. These capabilities are in sharp contrast to cryogenic methane/nitrogen separation, where the presence of even low ppm levels of these contaminants can be problematic. Also, since the process of the present invention operates at relatively high temperatures, such as above −40° C., above −25° C., above −10° C. or even around 10° C. or above, the formation of hydrates or liquified hydrocarbons is much less likely than in previous processes. Thus, unlike cryogenic separation and previous membrane separation processes, the process of the invention can be carried out, if desired, with little or no pretreatment of the incoming raw natural gas.

In another aspect, the invention is a process for producing one, two or three product streams of different nitrogen content, all of which may have value, from a nitrogen-contaminated natural gas stream that previously would have been of little or no value. In this aspect, the process includes two, three or more membrane separation steps connected in series as described above, so that the residue stream from the first step flows as feed to the second step, and so on.

The first membrane separation step produces the first product stream of value, a low-nitrogen, high-methane permeate stream. This nitrogen-depleted, hydrocarbon-enriched product stream typically contains no more than about 6%, more preferably no more than about 4%, nitrogen. Typically, the first product stream also contains at least about 70%, more preferably at least about 80%, of the methane content (or, where significant amounts of $C_{2+}$ hydrocarbons are also present, the total hydrocarbon content) of the feed stream.

The last membrane separation step produces two streams, a last permeate stream and a last residue stream, one or both of which may be product streams of value. The second stream of value is the permeate stream from the last step. This stream typically, and preferably, has no more than about 40% nitrogen, more preferably no more than about 35% or 30% nitrogen. Typically, this stream also has at least about 50% methane, plus small amounts of ethane and $C_{3+}$ hydrocarbons. Gas of this composition generally has a Btu value of at least about 700 Btu/scf, high enough to be a good source of compressor fuel gas.

The residue stream from the last membrane separation step is the third stream of value. This stream typically contains at least about 40% nitrogen, and often at least 50% nitrogen, 60% nitrogen or more. This stream also typically has a methane content no higher than about 50%, and preferably no higher than about 45% methane or 40% methane. This nitrogen-rich stream is still at pressure, and has value as an injectant gas into the formation producing the raw gas.

The invention is particularly useful for treating gas streams that arise as a result of nitrogen injection processes. Traditional oil-production techniques recover as little as 25–35% of the oil in a typical field. Recovery is improved by injecting carbon dioxide or nitrogen into the reservoir at the periphery. The gas dissolves in the remaining oil and lowers its viscosity, enabling it to be pushed more readily to the extraction wells. High-pressure nitrogen is also injected into gas fields to drive the gas to the wells, as well as to recover methane from coal bed methane reservoirs. The overall economics of such processes are dependent on the costs of the nitrogen injectant, which often has to be supplied from a cryogenic plant on site or a similarly costly source. A cost-effective process able to recover nitrogen at a composition suitable for reinjection makes these types of processes more efficient and attractive. The invention, particularly in its last aspect, provides such processes.

It is an object of the invention to provide a process for removing excess nitrogen from methane/nitrogen gas mixtures.

It is an object of the invention to provide a method for removing excess nitrogen from natural gas without cooling the gas to very low temperatures, such as below −40° C.

It is an object of the invention to provide a process for producing one, two or three streams of value from nitrogen-contaminated methane streams.

It is an object of the invention to provide a simple, reliable and cost-effective method for processing nitrogen-contaminated natural gas from small or remote fields.

It is an object of the invention to provide membrane-based processes that use only one compression step for removing excess nitrogen from natural gas.

Other objects and advantages will be apparent from the description of the invention to those skilled in the gas separation arts.

DETAILED DESCRIPTION OF THE INVENTION

Figure 1:
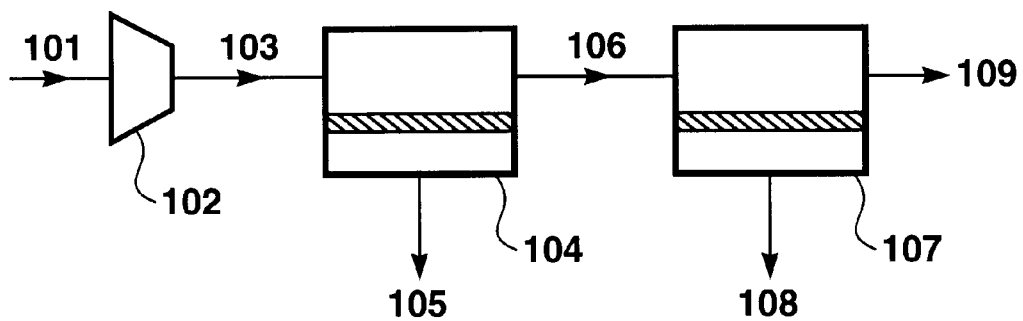
FIG. 1 is a schematic drawing of a basic embodiment of the invention.

The terms gas and vapor are used interchangeably herein.

The term $C_{2+}$ hydrocarbon means a hydrocarbon having at least two carbon atoms; the term $C_{3-}$ hydrocarbon means a hydrocarbon having at least three carbon atoms, and so on.

The term heavier hydrocarbons means $C_{3+}$ hydrocarbons.

The term light hydrocarbons means $C_1$–$C_6$ hydrocarbons.

The terms two-step and multistep as used herein with regard to a membrane separation unit mean an arrangement of membrane modules or banks of membrane modules connected together such that the residue stream from one module or bank of modules becomes the feed stream for the next.

The terms two-stage and multistage as used herein with regard to a membrane separation unit mean an arrangement of membrane modules or banks of membrane modules connected together such that the permeate stream from one module or bank of modules becomes the feed stream for the next.

Percentages herein are by volume unless otherwise stated.

The invention is a membrane separation process for treating a gas stream containing methane and nitrogen, and particularly for removing excess nitrogen from natural gas, such as arises from gas wells, oil wells, including wells employing nitrogen for enhanced oil recovery, landfills and the like. In its most basic aspect, the invention involves running a natural gas stream that is out of specification with respect to nitrogen across at least two membrane separation steps in series, the membrane separation steps being equipped with membranes that are selective in favor of methane over nitrogen. If the raw gas to be treated is not at a pressure high enough to provide adequate trans membrane driving force for an efficient process, it may be compressed before it enters the membrane separation steps.

A product permeate stream enriched in methane and depleted in nitrogen is withdrawn, usually at above atmospheric pressure, from the permeate side of the first membrane separation step. A residue stream depleted in methane and enriched in nitrogen is withdrawn from the feed side of the last membrane separation step. For a practical and economically attractive process, both the nitrogen content of the first permeate stream and the methane content of the last residue stream are important.

On the one hand, the amount of nitrogen that is acceptable in a methane-rich natural gas product stream depends on the destination of the methane. Natural gas pipeline specification is typically no more than 4% total inserts, so, depending on the other constituents of the gas, this means no more than about 4% nitrogen, but perhaps no more than about 2% or 3% nitrogen, for example, if carbon dioxide, helium, argon or other constituents are present. If the gas stream can be diluted with a supply of low-nitrogen content gas, higher nitrogen levels may be acceptable, for example up to about 6% or even 8% or more nitrogen.

On the other hand, loss of methane is an important factor in natural gas processing. Pipeline grade natural gas is typically at least about 85–95% methane, so methane is usually the desired product, and substantial losses of product can have an adverse effect on process economics. In addition, substantial quantities of methane in the non-product stream may make disposal or further treatment of this stream difficult. Therefore, methane loss should be kept as low as possible. In the present context, methane loss is defined as (lbmol methane in the feed gas to the process)−(lbmol methane in the product permeate stream)/(lbmol methane in the feed gas to the process) expressed as a percentage. As a general guideline, a loss of greater than about 30% of the methane content of the raw gas is undesirable, and much lower losses, such as no more than about 20%, 10% or 5%, depending on circumstances, are desirable and preferred.

As mentioned above, in some aspects, the invention produces three streams of value: the first permeate stream, the last permeate stream and the last residue stream, in increasing order of nitrogen concentration. If the last residue stream is used as an injectant gas for oil or gas recovery, a greater methane loss into this stream can be tolerated, because of the overall cost savings brought about by reusing the nitrogen rather than relying entirely on fresh injectant gas. In this case methane losses of more than 30% may be acceptable.

The process of the invention works by preferentially permeating methane and rejecting nitrogen. At first sight, this appears inefficient, because the major component of the stream is permeated and the minor component is rejected. Thus the stage cut and membrane area required to carry out the separation are relatively large, compared say to oxygen/nitrogen separation from air, which is done by permeating the minor component, oxygen, and rejecting the nitrogen.

Another unconventional aspect is that the process is carried out in two or more steps, rather than two or more stages, as would be the recognized technique in the art if the product stream is the permeate stream, and product purity is important.

We have discovered that, despite these apparent disadvantages, the process of the invention is able to meet natural gas pipeline specifications for nitrogen in a cost-effective manner.

Furthermore, pipeline grade methane can be obtained with an acceptably small methane loss. Methane recovery is normally at least about 70%, and is typically much higher, such as at least about 80% or 90%.

Another apparent disadvantage is that the natural gas is produced at low pressure and needs recompression to pipeline pressure. However, by operating with the permeate side of the membrane maintained at above atmospheric pressure, as discussed in more detail below, the gas can be maintained at high enough pressure to be carried through gas-gathering lines for additional treatment or compression at a central station.

The basic process of the invention in the configuration that includes a raw gas compression step is shown in schematic form in FIG. 1. The process as shown may be carried out at individual wellheads or on pooled gas at intermediate stations or central gas-processing facilities. It will be appreciated by those of skill in the art that this and the other figures are very simple schematic diagrams, intended to make clear the key aspects of the invention, and that an actual process train will usually include many additional components of a standard type, such as heaters, chillers, condensers, pumps, blowers, other types of separation and/or fractionation equipment, valves, switches, controllers, pressure-, temperature-, level- and flow-measuring devices and the like.

Turning specifically to FIG. 1, raw natural gas stream, 101, passes into compression step, 102, and emerges as compressed stream, 103. Stream 101 may be any natural gas, or indeed any methane-containing gas, from which it is desired to remove nitrogen. The gas may be from a natural gas well, may be associated gas produced in conjunction with oil, either spontaneously or as a result of nitrogen injection for enhanced oil recovery, may be gas gathered from a landfill, or may arise from any other source. As discussed in the Summary of the Invention section above, the invention is particularly useful for treating gas streams that arise as a result of nitrogen injection processes.

Stream 101 may be as-extracted from the ground or may have been subjected to pretreatment of any kind, including, but not limited to, filtration to remove particulates, entrained water or hydrocarbon liquids, separation by any means, including, but not limited to absorption, adsorption, condensation and membrane separation, of gaseous contaminants, such as acid gases, $C_{3+}$ hydrocarbon vapors or water vapor, and other membrane or non-membrane separation of methane and nitrogen. Stream 101 is typically at above atmospheric pressure, such as at a few hundred psia, but is not at sufficiently high pressure for the desired process performance.

The standard natural gas pipeline specification for inert gas content is less than 4%, so stream 101 will usually contain at least about 4% nitrogen, and frequently will contain considerably more nitrogen, such as at least about 10% or more. The process of the invention can be applied to streams of any nitrogen concentration in principle, but becomes increasingly expensive and requires additional treatment steps as the nitrogen concentration rises above about 25% or 30% nitrogen. Thus, it is most preferred that the nitrogen content of stream 101 be no more than about 30%. The other most significant component of the stream is methane, usually the major component, and the stream may typically contain a number of other components, most commonly water vapor, ethane, $C_{3+}$ hydrocarbons, carbon dioxide, hydrogen sulfide and other inert gases such as helium and argon.

The compressor used in compression step 102 may be of any convenient type, such as centrifugal, screw or reciprocating, based on considerations of outlet pressure needed, gas flow rate and composition, and like issues familiar to those of skill in the art. Screw compressors are relatively inexpensive and are widely used to reach pressures up to about 300 or 400 psia; for higher pressures, piston compressors are more commonly used. Typically, but not necessarily, the compression step raises the pressure of the gas stream between about 3-fold and 10-fold. This may be done in a single-stage or multiple-stage compressor, as is well known in the art.

For most applications of the process, it is neither necessary nor desirable to compress the feed gas to very high pressures. Rather, we have discovered that the capital costs of the equipment and the compressor horse power required to perform the process both tend to pass through minimum ranges when the feed gas pressure to the first membrane separation step is between about 400 psia and 1,500 psia. Thus, optimum results, in terms of the balance between costs and performance, are often achieved when the membrane separation steps operate at a feed pressure between about 400 and 1,500 psia, so it is preferred that the compression step results in a compressed stream 103 at a pressure in this range. Yet more preferably, the raw gas should be compressed to a feed pressure in the range 500–1,200 psia.

It is convenient, desirable, and generally possible to use waste gas from the process to power a gas engine to drive the compressor. This provides a cost advantage that is one of the attractive features of the process.

After compression, stream 103 is introduced into the feed side of first membrane separation step 104. The goal of this step is to produce a permeate stream, 105, having a substantially reduced nitrogen content compared with the feed stream. This stream is the primary product stream of the process. Although pipeline specification is 4% total inserts, it may not always be necessary to reduce the nitrogen content of stream 105 to 4% or below. This is because it may be possible to pool stream 105 with other gas that has a low inserts content before the stream is passed to the pipeline. Thus, in some cases, a nitrogen concentration of, for example, 6%, or even 8% or more, may be acceptable. Conversely, owing to a high content of other inert gases, such as carbon dioxide, it may sometimes be necessary to reduce the nitrogen concentration below 4%. Based on the present teachings, those of skill in the art will be able to adjust the process for greater or lesser nitrogen concentration as required.

Whatever the target nitrogen concentration, the first membrane separation step relies on a membrane that is selective in favor of methane over nitrogen. A synthetic polymer membrane separates the components of a gas or vapor mixture because the components permeate the membrane at differentrates. The permeability, P [cm$^3$(STP)·cm/cm$^2$·s·cmHg], of a polymer membrane material for a gas is defined as the rate at which that gas moves through a standard thickness [1 cm] of the material under a standard driving force [a pressure difference of 1 cmHg].

A measure of the ability of a membrane to separate two gases is the selectivity, $\alpha$, defined as the ratio of the gas permeabilities, $P_1/P_2$. Selectivity can also be expressed as:

$$\alpha = D_1/D_2 \cdot k_1/k_2$$

where D is the diffusion coefficient of the gas in the membrane [cm$^2$/s], which is a measure of the gas mobility, and k is the Henry's law sorption coefficient, which links the concentration of the gas in the membrane material to the pressure in the adjacent gas [cm$^3$(STP)/cm$^3$·cmHg].

The intrinsic selectivity of a polymer material is established by measuring the permeabilities with pure gas or vapor samples, then calculating the ratio. The actual selectivity obtained in a real separation process is established by making permeation measurements with gas mixtures.

The ratio $D_1/D_2$ is the ratio of the diffusion coefficients of the two gases and can be viewed as the mobility selectivity, reflecting the different sizes of the two molecules. The ratio $k_1/k_2$ is the ratio of the Henry's law solubility coefficients of the two gases and can be viewed as the solubility selectivity, reflecting the relative condensabilities of the two gases.

In all polymer materials, the diffusion coefficient decreases with increasing molecular size. Hence, the mobility component of the selectivity always favors the passage of small molecules over large ones. The solubility component of the selectivity, on the other hand, is a measure of the energy required for sorption and normally increases with molecular diameter, because larger molecules are normally more condensable than smaller ones. The combined effect of these two factors determines the selectivity of the membrane.

The balance between mobility selectivity and solubility selectivity is different for glassy and rubbery polymers. In glassy polymers, the diffusion term is usually dominant, permeability falls with increasing permeant size and the material is selective for small molecules over large ones. In rubbery polymers, the solubility term is usually dominant, permeability increases with increasing permeant size and the material is selective for large molecules over smaller ones. Elastomeric materials, therefore, tend to permeate larger, condensable molecules faster than small, low-boiling molecules.

Thus, most rubbery materials are selective in favor of all C$_{3+}$ hydrocarbons over low-boiling point gases. Examples of polymers that can be used to make such elastomeric membranes, include, but are not limited to, nitrile rubber, neoprene, polydimethylsiloxane and related silicone polymers, such as those listed in Table 1, chlorosulfonated polyethylene, polysilicone-carbonate copolymers, fluoroelastomers, plasticized polyvinylchloride, polyurethane, cis-polybutadiene, cis-polyisoprene, poly (butene-1), polystyrene-butadiene copolymers, polyamide-polyether block copolymers, styrene/butadiene/styrene block copolymers, styrene/ethylene/butylene block copolymers, and thermoplastic polyolefin elastomers.

The molecular kinetic diameters of nitrogen (3.64 A) and methane (3.8 A) are similar, and methane has a critical temperature of −82.6° C., so is only moderately more soluble than nitrogen in most polymer materials. The slightly smaller molecular size of nitrogen means that glassy materials slightly favor the passage of nitrogen over methane. The relative condensability of methane means that rubbery materials slightly favor the passage of methane over nitrogen. As a result of the similar molecular sizes and the poor condensability of both components, however, both glassy and rubbery membrane materials have poor selectivity for this gas pair, as was illustrated in Table 1.

In rubbery membrane materials such as silicone rubbers, the diffusion coefficients decrease with decreasing temperature, but sorption coefficients increase. As disclosed in U.S. Pat. No. 5,669,958, this results in certain rubbery polymers exhibiting a surprisingly good increase in selectivity with decreasing temperature. Therefore, the preferred membranes for use in membrane separation step 104 are those in which the selective layer is made from such materials. A particularly preferred material is polydimethylsiloxane. Other preferred materials with similar properties are poly(siloctylene-siloxane) and poly(p-silphenylene-siloxane).

As can be seen from the brief explanation of the solution/diffusion transport mechanism above, it is important that the material to be used remains rubbery under the temperature conditions at which it is used. Thus, the selected material should have a glass transition temperature at least about 20–30° C. below the lowest operating temperature to which the membranes are likely to be exposed. Glass transitions temperatures for some suitable polysiloxanes are given in U.S. Pat. No. 5,669,958. Glass transition temperatures for many rubbery polymers may be found in *Polymer Handbook*, J. Brandrup and E. H. Immergut (eds.), Second edition, Wiley Interscience, 1975.

U.S. Pat. No. 5,669,958 indicates that polyamide-polyether block copolymers are not suitable for use as methane/nitrogen separation membranes at low temperature, because the polymer rapidly becomes more glassy in behavior as the temperature falls below about −20° C. (see Example 7 and FIG. 9 of '958), and the required methane/nitrogen selectivity of 5 is never attained. However, since the present process can be operated at lower methane/nitrogen selectivity, for example at a selectivity of 2 or 3, it can be seen that at least some grades of polyamide-polyether block copolymers are able to provide adequate selectivity, even at low temperatures, and are, therefore, usable as membrane materials for the invention.

As a less preferred alternative, super-glassy materials, which are also known to be selective for more condensable over less condensable components in a gas mixture, may be used. Such materials and membranes made from them are described in U.S. Pat. Nos. 5,281,255 and 5,707,423, for example.

The membrane may take any convenient form known in the art. Usually, rubbery materials do not have enough mechanical strength to be formed as unsupported membranes. Therefore, preferred embodiments incorporating rubbery selective materials involve the use of a composite membrane comprising a microporous support, onto which the rubbery selective layer is deposited as a thin coating. The preparation of such membranes is well known in the membrane-making art. The preferred form is a composite membrane including a microporous support layer for mechanical strength and a rubbery polymeric coating layer, most preferably silicone rubber, that is responsible for the separation properties. Additional layers may be included in the structure as desired, such as to provide strength, protect the selective layer from abrasion, and so on.

The membranes maybe manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice. Since conventional polymeric materials are preferred for the membranes, they are relatively easy and inexpensive to prepare and to house in modules, compared with other types of membranes that might be used as organic-selective membranes, such as finely microporous inorganic membranes, including adsorbent carbon membranes, pyrolysed carbon membranes and ceramic membranes.

Whatever their composition and structure, the membranes should preferably have a selectivity for methane over nitrogen of at least about 2, and more preferably at least about 3 or 4. As taught in U.S. Pat. No. 5,669,958, and shown in the Examples section below, the selectivity of silicone rubber membranes for methane over nitrogen increases from about 2.5 at about 20° C. to about 3.3 at about 0° C., to about 4 at about −20° C., and to about 5 at −60° C.

In the present invention, unlike the process of 5,669,958, it is not necessary to achieve a selectivity of 5 for a useful process, because of the newly taught two-step configuration and optional operating pressure constraints. Hence, it is not necessary to operate the membrane separation steps at such low temperatures (although, of course, if low temperatures can conveniently and economically be provided, the membrane separation capability will be correspondingly enhanced). Thus, the preferred operating temperature for step 104 is above about −40° C., more preferably above −25° C., and most preferably above −10° C. or even above 10° C. In terms of ranges, the preferred operating temperature is between about 40° C. and −40° C., more preferably between about 20° C. and −25° C., and most preferably between about 10° C. and −10° C.

Since the Joule-Thomson effect promotes cooling of both the permeate and residue streams as gas travels through the membrane modules, the average temperature within a membrane module in the present separations is typically lower than the temperature at the inlet of the feed gas. Feed stream 103 can frequently be brought to an appropriate temperature for introducing into the feed side inlet that is within or a little above the above-specified preferred temperature ranges by heat exchange against one or both membrane permeate streams 105 and 108, as shown in the preferred embodiment of FIG. 2, discussed below. Additional cooling of stream 103 may be provided by heat exchange against stream 109, which may optionally be fuirther lowered in temperature by, for example, running through a turbo-expander, as is well known in the art. Less preferably, external refrigeration using propane or similar refrigerants may be used.

In almost all cases, it is possible to provide ample cooling of the incoming feed stream simply by heat exchange against one or more of the residue and permeate streams of the process. In these instances, the process relies for cooling entirely on the Joule-Thomson expansion of gas across the membranes. Thus no additional cooling energy need be supplied in any form.

A driving force for trans membrane permeation is provided by a pressure difference between the feed and permeate sides of the membrane. This driving force is provided by compression step 102, from which membrane feed stream 103 emerges at an elevated pressure, typically of about 1,000 psia. The pressure on the permeate side may be set to any desired value. Based on our calculations of the economics of the process, however, we prefer to operate maintaining a substantially above atmospheric pressure permeate pressure. By substantially above atmospheric pressure, we mean at least about 25 psia, more preferably at least about 50 psia or at least about 100 psia, and most preferably at least about 200 psia. In most cases, operating at these pressures or above enables the treated product stream 105 to be passed out of the process of the invention to a gas gathering station or to other treatment as desired without recompression. Usually, gas leaving the process is destined ultimately for the natural gas pipeline. If the gas can leave the process at, for example 100 psia or 200 psia, the compression energy and costs to bring it to pipeline pressure are correspondingly controlled.

The ratio feed pressure/permeate pressure is known as the pressure ratio. The mathematical relationship between pressure ratio and selectivity is a complicated expression. (This expression is derived, for example, in chapter 8 of *membrane Technology and, Applications*, R. W. Baker, McGraw Hill, 2000) This expression predicts three regions of performance, expressed as the permeate concentration of a permeating component, for a membrane separation process.

If the numerical value of the pressure ratio, $\phi$, is much larger than the numerical value of the selectivity, $\alpha$, then the process operates in the selectivity-limited region, and the permeate concentration is essentially independent of the pressure ratio and is determined by the selectivity. In this region, a membrane separation process can take advantage of the fall intrinsic separating power of the membrane, and, assuming a given feed composition, the higher the selectivity, the better the separation performance will be.

At the other extreme, if the numerical value of the pressure ratio is much smaller than the selectivity, then the process operates in the pressure-ratio-limited region, and the permeate concentration is essentially independent of the membrane selectivity and is determined by the pressure ratio. In the third region, where the pressure ratio and the selectivity are of about the same order of magnitude, the separation performance is affected by both the pressure ratio and the selectivity. In other words, although the pressure ratio influences performance to some extent, the process is still able to benefit from the selectivity of the membrane.

In the present case, we have devised a process that works adequately when the selectivity of the membrane is numerically low, such as 2, 3 or 4. Therefore, the process inclines toward the selectivity-limited region so long as the pressure ratio is at least about 3, and is essentially in the selectivity-limited zone so long as the pressure ratio is at least about 8 or 10. Thus, we have recognized that there is no benefit to the separation performance by operating at substantially higher pressure ratios than about 10 or 15, by either providing very high pressures on the feed side or low pressures on the permeate side, or both. A low pressure on the permeate side, such as below 25 psia or in many cases even below 50 psia, will simply increase the cost and complexity of the recompression steps needed before the treated gas can enter the pipeline, and a very high pressure on the feed side, such as above about 1,200 or 1,500 psia, will simply increase the cost and complexity of the process compression step 102. Thus the preferred feed and permeate pressure combinations are such as to give a pressure ratio generally in the range between about 3 and 10.

Of course, the pressure difference across the membrane also influences the membrane separation step, because the transmembrane flux of a permeating component is proportional to the partial pressure difference, $\Delta p$, between the feed partial pressure and permeate partial pressure of that component. However, the rubbery membrane materials suitable for methane/nitrogen separation are very permeable compared to many membrane materials, so a very large $\Delta p$ driving force is not required to obtain adequate flux. The transmembrane pressure-normalized flux of the organic component should be at least about 1 gpu ($1\times10^{-6}$ cm$^3$ (STP)/cm$^2$·s·cmHg), more preferably at least about 50 gpu and most preferably at least about 100 gpu.

To achieve fluxes of these orders, the selective layer responsible for the membrane separation properties should be thin, preferably, but not necessarily, no more than 30 $\mu$m thick, more preferably no more than 20 $\mu$m thick, and most preferably no more than about 10 $\mu$m thick. Although composite membranes with silicone rubber selective layers of just 1 or 2 $\mu$m thick can be made, extremely thin membranes, such as less than about 5 $\mu$m thick, are not preferred, since the resulting extremely high fluxes may give rise to a permeant-depleted boundary layer at the membrane surface on the feed side, and hence to overall diminished separation performance.

Membrane separation step 104 results in a first residue stream, 106, that is enriched in nitrogen and depleted in methane compared with the membrane feed stream, 103, and a first permeate stream, 105, that is enriched in methane and depleted in nitrogen compared with the membrane feed stream 103. The permeate stream is withdrawn from the process as the primary product stream, and preferably contains no more than about 6% nitrogen, and most preferably no more than about 4% nitrogen.

First residue stream 106 is withdrawn from the outlet of the first membrane separation step feed side and passed as feed to the feed side inlet of the second membrane separation step 107. Stream 106 will normally be at essentially the same pressure as stream 103, subject only to any small pressure drop that occurs along the length of the membrane modules in step 104. In a properly designed gas separation system, this drop should be no more than a few psi. Thus, recompression, though not explicitly excluded from the process, is not generally required before stream 106 enters step 107. The membranes used in this step are also selective for methane over nitrogen, and are typically, although not necessarily, made from the same membrane materials as the membranes of step 104.

Owing to Joule-Thomson cooling effects in step 104, the feed gas cools as it passes down the module and first residue stream 106 is usually quite cold, such as below 0° C.; this stream, therefore, can normally pass as feed into step 107 without any additional cooling by heat exchange or external cooling. Light hydrocarbons ($C_2$–$C_6$ hydrocarbons) will always be present in feed stream 103 to some extent. In general, the higher the concentration of such hydrocarbons in the feed gas, the greater will be the cooling produced by Joule-Thomson expansion, and the lower will be the resulting temperature of streams 106 and 105. In some cases, it may be desirable to allow stream 106 to warm after leaving the first membrane step and before entering the second membrane step, to keep the operating temperature of step 107 within the preferred range.

The considerations concerning membrane type, selectivity, pressure ratio, pressure difference, and so on, in step 107 are similar to those for step 104. Thus, the step: (i) can be operated at comparatively low methane/nitrogen selectivity, such as about 2, 3 or 4, and, therefore, at comparatively high temperatures, such as above about –40° C., –30° C. or –20° C.; (ii) should preferably operate at a feed pressure no higher than about 1,500 psia, and more preferably no higher than 1,200 psia; (iii) should operate at a permeate pressure above atmospheric pressure, preferably above about 25 psia, and more preferably above about 50 psia, 100 psia or higher; and (iv) preferably should provide a pressure ratio no higher than about 15, and most preferably in the range about 3–10.

By selectively retaining nitrogen, membrane separation step 107 results in a second residue stream, 109, that is enriched in nitrogen and depleted in methane compared with the membrane feed stream, 106, and a second permeate stream, 108, that is enriched in methane and depleted in nitrogen compared with the membrane feed stream 106.

Permeate stream 108 may be sent to any appropriate destination. In the embodiment of FIG. 1, permeate stream 108 is simply indicated as leaving the process. Such an embodiment is generally most suitable when the raw gas to be treated is not heavily contaminated with nitrogen, for example, contains no more than about 10% nitrogen. In this case, stream 108 typically represents no more than about 15% or 20% by volume of the raw gas. In the FIG. 1 embodiment, stream 108 may be particularly important as the second stream of value from the process, for the following reasons.

As described above, one of the principal uses of the process of the invention is to remove nitrogen from high-nitrogen natural gas so that the gas can be delivered to the pipeline. In an economical process, at least 70% and preferably at least 80% or more of the total hydrocarbon content of the process feed gas should be obtained in the product gas stream 105.

However, a significant amount of gas is required as engine fuel to drive the compressor of compression step 102 and other compressors and equipment used during gas gathering and processing operations in the field. In fields where turbines are operated, such as for electric power generation, turbine fuel is also needed. Such fuel streams could be provided by diverting a portion of the raw feed gas stream 101 or the high-quality product stream 105. If, instead, gas is taken from streams 108 or 109 to power field equipment, particularly the process compressor for step 102, fuel is obtained without having to divert any of either the feed gas 101 or the product gas 105 for this purpose.

Natural gas compressors are usually powered by piston engines, which can typically operate with up to 30% nitrogen in the fuel, and sometimes, depending on the other hydrocarbon content of the gas mix, with as much as 40% or even more nitrogen in the gas.

Therefore, stream 108 can generally be used as compressor engine fuel so long as the process can be configured such that this stream has a nitrogen content no more than about 40% nitrogen, more preferably no more than about 35% or 30% nitrogen, and a methane and other hydrocarbons content of at least about 50%. The Btu value of such gas is typically about 700 Btu/scf or more, high enough that the gas is a good fuel, and the stream may conveniently be burnt to drive a gas engine to power the compressor used in step 102.

If the raw gas stream 101 is more heavily contaminated with nitrogen, such as containing more than about 10% nitrogen, permeate stream 108 tends to be larger, such as about 40%, 50% or more by volume of the raw gas. In this case, using this stream as fuel is less preferred than recirculating it within the process for additional methane recovery, as described below for FIGS. 2 and 3.

In some embodiments of the process, second residue stream 109 is a waste stream, and is simply withdrawn from the feed side outlet of step 107 and flared or otherwise disposed of. Since it is at high pressure, energy may be extracted from the stream before disposal or flaring by passing it through a turbo-expander, as is well known in the art. The expander may also be used to provide compressor power for the compression step.

In other cases, stream 109 may meet the compositional or Btu requirements for a fuel product and may be used, in whole or in part, to power field equipment as discussed above.

If the process cannot be configured so that streams 108 or 109 yield a fuel gas product meeting such requirements, it is possible, though less desirable, to mix either stream 108 or 109 with a small amount of gas from stream 101, for example, to produce an acceptable fuel.

Figure 3:
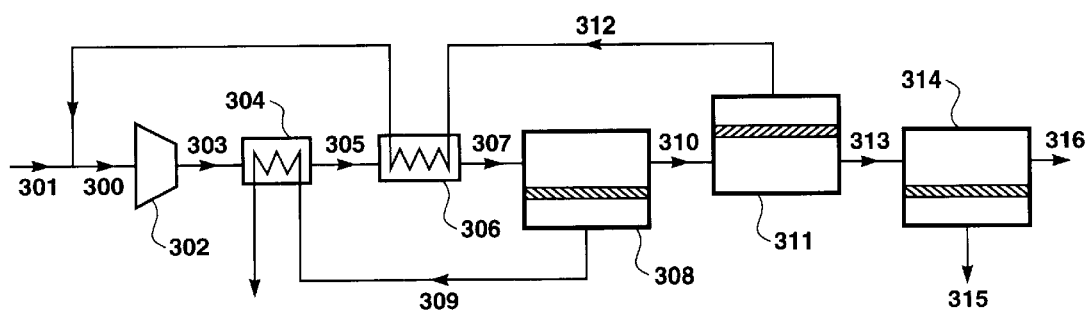
FIG. 3 is a schematic drawing of an alternative embodiment of the invention using three membrane steps.

As yet another preferred alternative, stream 109 may be passed to additional treatment, for example as shown in FIG. 3 and discussed below.

In other embodiments, stream 109 is a discrete third stream of value produced by the process. This stream is the most nitrogen-rich stream produced by the process of FIG. 1, and generally contains no more than about 40% or 50% methane, and at least about 40% nitrogen, and often at least 50% nitrogen, 60% nitrogen or more. This high-pressure, nitrogen-rich stream can be injected as a substitute for, or a supplement to, fresh nitrogen in fields where nitrogen-injection is being practiced for any reason. The attendant savings in complexity of operations and cost of production are expected to be beneficial.

Figure 2:
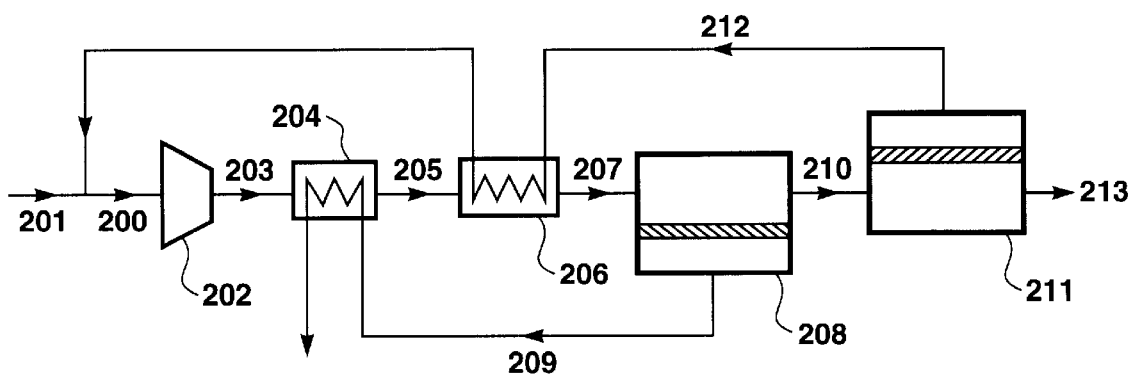
FIG. 2 is a schematic drawing of a preferred embodiment of the invention including recycle of the second permeate stream and cooling provided by heat exchange.

Turning to FIG. 2, this shows a preferred embodiment of the invention, including cooling of the incoming membrane feed stream by heat exchange against the membrane permeate streams, and recirculation of the second permeate stream within the process. Unless otherwise indicated, parameter preferences and comments, such as those relating to membrane type, selectivity, gas temperatures at the inlets of the individual membrane separation steps, feed and permeate pressures and pressure ratio, and permeate product stream composition, for FIG. 2 are the same as those for FIG. 1.

Raw gas stream, 201, typically comprising at least about 50% methane and at least about 4% nitrogen, is combined with recirculation stream 212, described below, to form stream 200. Stream 201 may be any natural gas or other methane-containing gas, and may or may not have been subjected to pretreatment, such as filtration, removal of contaminant gases (such as carbon dioxide, water vapor or $C_{3+}$ hydrocarbons), or partial separation of nitrogen from methane. Stream 201 will usually contain at least about 4% nitrogen, frequently contains at least about 10% nitrogen, and preferably contains no more than about 30%, more preferably no more than about 25%, nitrogen.

Combined stream 200 passes into compression step, 202, and emerges as compressed stream, 203. Stream 203 passes through first heat exchange step 204, where it is cooled by running in heat exchanging relationship against first permeate stream, 209, forming partially cooled stream, 205. Since $C_{3+}$ hydrocarbons are always likely to be present in stream 203 to some extent, cooling will frequently result in the condensation of a portion of these hydrocarbons, which may be removed in a knock-out pot, not shown, as is well known in the industry. Stream 205 passes through second heat exchange step 206, where it is cooled by running in heat exchanging relationship against second permeate stream, 212, to form cooled stream, 207. Again, any condensed material may be removed by running through a knock-out pot.

Stream 207 is passed on the feed side into membrane separation step, 208. Membrane separation step 208 results in a first residue stream, 210, that is enriched in nitrogen and depleted in methane compared with the membrane feed stream, 207, and a first permeate stream, 209, that is enriched in methane and depleted in nitrogen compared with the membrane feed stream 207. Permeate stream 209 is passed as coolant through heat exchange step 204 and is then withdrawn from the process as the primary product stream. This is the most methane-rich, nitrogen-depleted stream emerging from the process and preferably contains no more than about 6% nitrogen, and most preferably no more than about 4% nitrogen.

First residue stream 210 is passed as feed to second membrane separation step 211, where it is separated into second permeate stream 212 and second residue stream 213. Second permeate stream 212 is passed as coolant through heat exchange step 206 and is then recirculated to the front of the process to form part of the feed 200 to compression step 202. FIG. 2 shows stream 212 as entering the front of the compression step with raw stream 201 as combined intake stream 200. Thus, it is most preferred if the pressure on the permeate side of membrane separation step 211 is maintained at approximately the same pressure as raw stream 201. If stream 212 is at a significantly lower pressure than stream 201, it must be recompressed before it can be mixed with stream 201. If this situation cannot be avoided, perhaps because stream 201 is already at comparatively high pressure, the embodiment of FIG. 4, described later, can be used. It is possible, though much less desirable (because it introduces more moving equipment, increases overall compressor capacity requirements, and reduces reliability), to include a discrete second compressor in line 212.

Second residue stream 213 is withdrawn from the process, and may be used as engine or turbine fuel, particularly for a gas engine used to drive the compressor for compression step 202, may be reinjected, may simply be flared, or may be subjected to further treatment as desired.

A particularly preferred, but non-limiting, form of further treatment is shown in the embodiment of FIG. 3. Unless otherwise indicated, parameter preferences and comments, such as those relating to membrane type, selectivity, gas temperatures at the inlets of the individual membrane separation steps, feed and permeate pressures and pressure ratio, and permeate product stream composition, for FIG. 3 are the same as those for FIG. 2.

The embodiment of FIG. 3 shows the invention in one of the particularly preferred aspects in which three streams of value are produced from the raw, nitrogen-contaminated feed gas. Turning to FIG. 3, raw gas stream, 301, typically comprising at least about 50% methane and at least about 4% nitrogen, is combined with recirculation stream 312, to form stream 300. As before, stream 301 may be from any source and may have been treated by any desired form of pretreatment. Stream 301 will usually contain at least about 4% nitrogen, frequently contains at least about 10% nitrogen, and preferably contains no more than about 30%, more preferably no more than about 25%, nitrogen.

Combined stream 300 passes into compression step, 302, and emerges as compressed stream, 303. Stream 303 passes through first heat exchange step 304, where it is cooled by running in heat exchanging relationship against first permeate stream, 309, forming partially cooled stream, 305. Stream 305 passes through second heat exchange step 306, where it is cooled by running in heat exchanging relationship against second permeate stream, 312, to form cooled stream, 307, which is passed on the feed side into membrane separation step, 308. As described above with respect to FIG. 2, liquid water or hydrocarbons formed as a result of cooling can be removed in a knock-out drum or drums.

Membrane separation step 308 results in a first residue stream, 310, that is enriched in nitrogen and depleted in methane compared with the membrane feed stream, 307, and a first permeate stream, 309, that is enriched in methane and depleted in nitrogen compared with the membrane feed stream 307. Permeate stream 309 is passed as coolant through heat exchange step 304 and is then withdrawn from the process as the primary product stream. This stream has the lowest nitrogen content, typically no more than about 6%, more preferably no more than about 4%, and the highest methane and other hydrocarbons content, typically at least about 70%, preferably at least about 80%, of the three product streams.

First residue stream 310 is passed as feed to second membrane separation step 311, where it is separated into second permeate stream 312 and second residue stream 313. Second permeate stream 312 is passed as coolant through heat exchange step 306 and is then recirculated to the front of the process to form part of the feed 300 to compression step 302.

Second residue stream 313 is passed as feed to an auxiliary membrane separation step, 314, that again uses membranes selective for methane over nitrogen. Stream 313 remains at close to the pressure of stream 303, subject only to minorpressure drops along the modules of steps 308 and 311; thus, step 314 can usually be operated simply under the driving force provided by the high pressure of stream 313. The gas of stream 313 has been subject to Joule-Thomson cooling effects as it passes through both preceding membrane separation steps, and may be at a very low temperature, such as −30° C., or even below. The methane/nitrogen selectivity that results in step 314 may, therefore, be slightly higher than that achieved in the upstream membrane separation steps. Thus, if desired, a slightly higher pressure ratio may be appropriate in this last membrane step than is used in the upstream steps, achieved by withdrawing the permeate stream 315 at lower pressure than the pressures of streams 309 and 312.

If desired, stream 313 may be allowed to warm to bring it to an operating temperature within the preferred range.

Otherwise, the considerations concerning membrane type, selectivity, operating temperature, pressure ratio, pressure difference and so on in step 314 are similar to those for the other membrane separation steps of the process.

The membrane area required for step 314 depends on the volume flow of stream 313, but is usually small compared with the membrane area required for steps 308 and 311. Typically, the inclusion of step 314 adds no more than about 10% to the total membrane area required to carry out the process.

Step 314 fractionates stream 313 into two further product streams: a methane-enriched permeate stream, 315, typically containing at least about 50% or 60% methane, small amounts of ethane and other light hydrocarbons, and no more than about 40% nitrogen; and a nitrogen-enriched residue stream, 316, typically containing at least about 50% or 60% nitrogen and no more than about 50% or 40% methane. Preferably, the permeate stream has a Btu value of about 700 Btu/scf or above and is used as fuel, most preferably for a gas engine used to drive compression step 302, and the residue stream, which is the product stream with the highest nitrogen and lowest hydrocarbon content, is reinjected.

In embodiments such as those of FIGS. 2 and 3, the second permeate stream is recirculated to the compression step. In that case, the pressure on the permeate side of the second membrane separation step is determined by the intake suction pressure of the compression step. Thus, the pressure ratio of the second membrane separation step is determined by the pressure ratio exhaust: intake of the compression step. If the raw gas stream to be treated by the process is already at comparatively high pressure, such as above about 600 psia, and the compression step raises the gas pressure to only 1,000 psia or 1,200 psia, for example, this results in a pressure ratio of only 2 or less across the second membrane separation step, which, in turn leads to a poorer separation in this step. To meet process targets for nitrogen content of the product gas and overall methane loss then requires the recycle stream to be very large, increasing membrane area required and compressor size.

Figure 4:
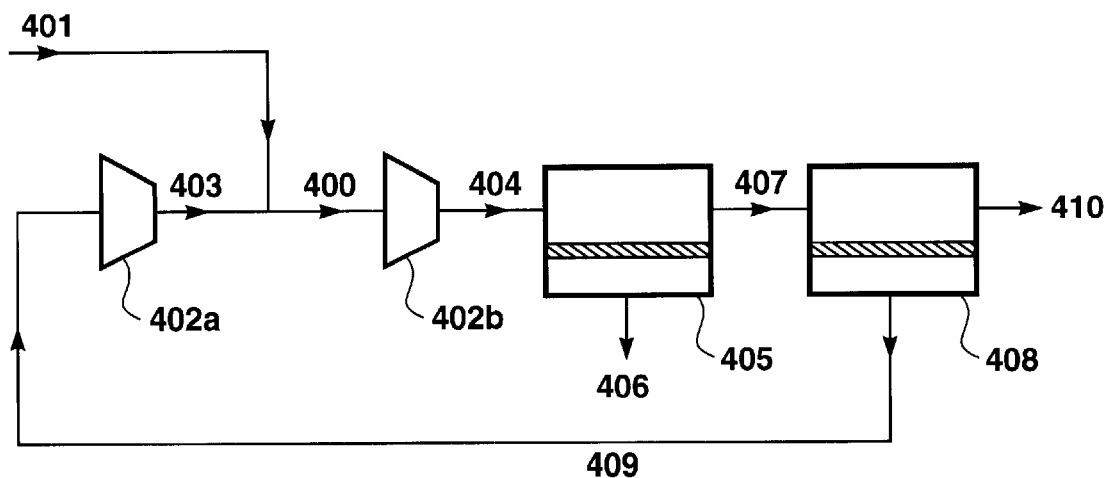
FIG. 4 is a schematic drawing of an embodiment of the invention for treating high-pressure raw gas.

A better alternative in this case is the design shown in FIG. 4. Once again, unless otherwise indicated, parameter preferences and comments, such as those relating to membrane type, selectivity, gas temperatures at the inlets of the individual membrane separation steps, feed and permeate pressures and pressure ratio, and permeate product stream composition, for FIG. 4 are the same as those for FIGS. 1, 2 and 3.

Referring to FIG. 4, compression step 402 now takes place in two compression stages, 402a and 402b, and gas can enter the compression step either on the suction side of the lowest stage, or at a point of intermediate pressure as shown. The compressors used in each stage may be of the same or different types. For clarity of understanding the concept, FIG. 4 indicates two discrete compressors. It is possible, convenient and preferred, however, to use a single compressor having two or more multiple stages in series at successively higher inlet and outlet pressures, and adapted to accept multiple intakes at different pressures, as is known in the compressor art.

In this case, raw gas stream, 401, comprising methane and at least about 4% nitrogen, enters the process at a pressure-compatible intermediate stage in the compression train and is mixed with partially compressed stream 403 to form stream 400. As before, the raw gas may be from any source and may have been submitted to any desired pretreatment. Stream 401 will usually contain at least about 4% nitrogen, frequently contains at least about 10% nitrogen, and preferably contains no more than about 30%, more preferably no more than about 25%, nitrogen.

Combined stream 400 passes through second compression stage 402b emerging as compressed stream 404. After cooling as required, preferably by heat exchange as was shown in earlier figures, stream 404 passes on the feed side into first membrane separation step, 405. This step results in a first residue stream, 407, that is enriched in nitrogen and depleted in methane compared with the membrane feed stream, 404, and a first permeate stream, 406, that is enriched in methane and depleted in nitrogen compared with the membrane feed stream 404. Permeate stream 406 is withdrawn from the process as the primary product stream, and preferably contains no more than about 6% nitrogen, and most preferably no more than about 4% nitrogen.

First residue stream 407 is passed as feed to second membrane separation step 408, where it is separated into second permeate stream 409 and second residue stream 410. Second residue stream 410 typically contains at least about 40%, 50% or more nitrogen, and may be used as fuel, reinjected, flared, fractionated, or otherwise disposed of as convenient. As before, it is particularly preferred to add a small third membrane separation step to split the second residue stream into two additional product streams of different nitrogen content, one a permeate stream suitable for use as fuel and containing no more than about 40% nitrogen, the other a residue stream containing at least about 50% nitrogen and suitable for reinjection.

As discussed above, the preferred pressure ratio in both the first and second membrane separation steps of the process is between about 3 and 10. As a representative example, a typical value in this preferred range might be achieved with a membrane feed side pressure of 1,000 psia and a permeate side pressure of 200 psia. If the raw gas is at 600 psia, for example, stream 409 is, therefore, at too low a pressure to be mixed directly with the raw gas. Instead, it is recirculated to the compression step 402, and enters on the suction side of the first stage 402a, whence it emerges at a suitable pressure as partially compressed stream 403 for mixing with raw feed stream 401.

Figure 5:
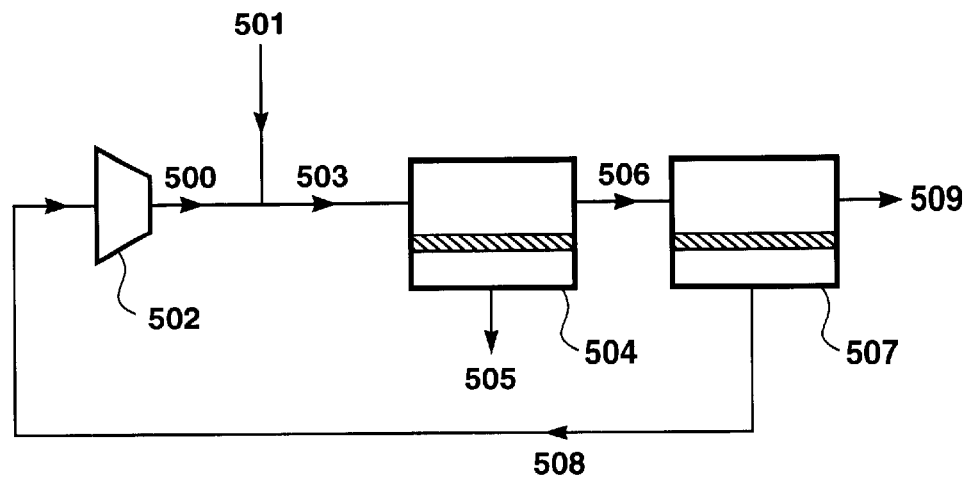
FIG. 5 is a schematic drawing of an alternative embodiment of the invention for treating high-pressure raw gas.

If the raw gas stream to be treated by the process is at sufficiently high pressure to operate the process satisfactorily without further compression, a different basic process configuration than that described so far may be used. Such a configuration is shown in FIG. 5. As before, the process may be carried out at individual wellheads, on pooled gas streams at intermediate stations or at central gas-processing facilities. Also as before, the process can normally be configured to achieve at least about 70% methane recovery, and recovery is typically much higher, such as at least about 80% or 90%.

Referring to FIG. 5, high-pressure raw gas stream, 501, comprising methane and at least about 4% nitrogen, enters the process. Also as with previous embodiments, stream 501 may be any natural gas or other methane-containing gas, and may or may not have been subjected to pretreatment, such as filtration, removal of contaminant gases, or partial separation ofnitrogen from methane.

Stream 501 may be at any pressure adequate to operate the process, by which is generally meant any pressure higher than a few hundred psia, such as 200 psia, 300 psia or 400 psia. For good performance, however, the pressure should preferably be considerably higher, such as at least about 500 psia, at least about 700 psia, or at least about 1,000 psia. Composite polymer membranes are mechanically strong, and can typically operate at pressure differences across the membrane up to about 2,000 psia. If the raw gas is at much higher pressure than this, it may sometimes be necessary to lower the pressure before introducing the gas into the membrane units.

Stream 501 will usually contain at least about 4% nitrogen, frequently contains at least about 10% nitrogen, and preferably contains no more than about 30%, more preferably no more than about 25%, nitrogen.

Stream 501 is mixed with compressed recycle stream, 500, and passes as feed stream 503 on the feed side into first membrane separation step, 504. As with the previous embodiment, the goal of this step is to produce a product stream having a low nitrogen content compared with the feed stream, typically, but not necessarily no more than 6% or 4% nitrogen, and step 504 relies on a membrane that is selective in favor of methane over nitrogen to meet this goal.

Preferred membrane materials and membrane configurations for carrying out step 504 are the same as those described above with respect to the previous embodiments, specifically composite membranes with silicone rubber selective layers housed in spiral-wound modules. Under the conditions of operation, the membranes should preferably have a selectivity for methane over nitrogen of at least about 2, and more preferably at least about 3 or 4. To achieve such selectivity, step 504 should preferably be operated in the temperature range between about 40° C. and −40° C., more preferably between about 20° C. and −30° C., and most preferably between about 10° C. and −25° C. This operating temperature within the membrane modules may be achieved by cooling feed stream 503 to an appropriate temperature by heat exchange against other process streams or otherwise, as described above. In this case, the process design will include heat exchangers through which streams 500, 501 or 503 pass, preferably in a manner similar to that shown in FIGS. 2 and 3. Likewise, knock-out drums may be included to removed condensed liquids.

The pressure on the permeate side of the membranes of step 504 is preferably maintained above atmospheric as described previously, to facilitate transport of the product gas to its next destination, as well as to reduce recompression costs. Preferred permeate pressure is at least about 25 psia, more preferably at least about 50 psia or at least about 100 psia, and most preferably at least about 200 psia.

As with the embodiment of FIG. 1, a pressure ratio, $\phi$, greater than about 10 or 15 offers no particular benefit so long as the pressure ratio is high enough that the step operates outside the pressure-ratio-limited region. Thus, it is again preferred that the feed and permeate pressure are such as to give a pressure ratio in the range between about 3 and 10. Since the pressure of the raw gas in the present embodiment is often quite high, such as well above 1,000 psia, the permeate pressure may on occasion be able to be maintained as high as, for example, even 300 psia or 400 psia in this case.

Step 504 results in a first residue stream, 506, that is enriched in nitrogen and depleted in methane compared with the membrane feed stream, 503, and a first permeate stream, 505, that is enriched in methane and depleted in nitrogen compared with the membrane feed stream 503. Permeate stream 505 is withdrawn from the process as the primary product stream. Preferably, this stream contains no more than about 6% nitrogen, and most preferably no more than about 4% nitrogen.

First residue stream 506 is passed as feed, usually without needing recompression or additional cooling, to second membrane separation step 507. The considerations concerning membrane type, selectivity, operating temperature, pressure ratio, pressure difference and so on in step 507 are similar to those for step 504. Thus, the step: (i) can be operated at comparatively low methane/nitrogen selectivity, such as about 2, 3 or 4, and, therefore, at comparatively high temperatures, such as above about −40° C., −30° C. or −20° C.; (ii) should preferably operate at a feed pressure of at least about 500 psia, more preferably at least about 700 psia, and most preferably at least about 1,000 psia; (iii) should operate at a permeate pressure above atmospheric pressure, preferably above about 25 psia, more preferably at least about 50 psia, and most preferably at least about 100 psia or 200 psia, and (iv) preferably should provide a pressure ratio between about 3 and 10.

Step 507 separates stream 506 into second permeate stream 508 and second residue stream 509. Second residue stream 509 typically contains at least about 40%, 50% or more nitrogen. As before, it is convenient and provides a cost advantage to use at least a part of this waste gas to power a gas engine to drive the compressor. Alternatively, stream 509 may be reinjected, flared, fractionated, or otherwise disposed of as convenient. Particularly preferred embodiments involve the use of a third ancillary membrane separation step to provide two additional product streams of value, a permeate stream suitable for use as engine fuel and containing no more than about 40% nitrogen, and a residue stream containing at least about 50% nitrogen and suitable for reinjection.

Second permeate stream 508 is recirculated within the process for additional methane recovery. This is achieved by passing it through compression step 502. In this embodiment, since the raw gas does not require compression, the compressor capacity need only accommodate the recycle gas, and so capacity and costs are generally lower than in the embodiments described earlier. The recirculated gas emerges from the compression step as compressed stream 500 at a suitable pressure for mixing with raw stream 501.

Although FIGS. 4 and 5 show embodiments that include return of the second permeate stream 508 within the process, it will be apparent to those of skill in the art that embodiments in which the second permeate stream is discharged from the process to another destination are also possible for these higher pressure raw gas stream applications. Such an embodiment may be preferred if streams 409 and 508 represent no more than about 10% by volume of streams 401 and 501 respectively, for example. In this case, the loss of methane associated with discharging stream 409 or 508 is relatively small.

The invention is now further described by the following examples, which are intended to be illustrative of the invention, but are not intended to limit the scope or underlying principles in any way.

EXAMPLES

Examples 1

Not in Accordance with the Invention

Figure 9:
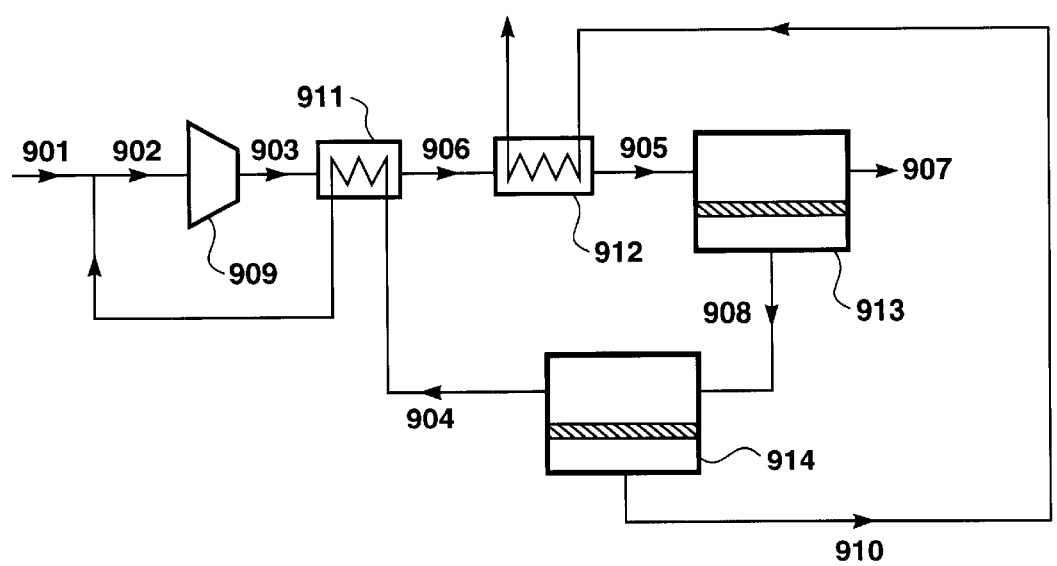
FIG. 9 is a schematic drawing of a process for separating methane and nitrogen using a two-stage configuration for the membrane separation unit.

A computer calculation was performed with a modeling program, ChemCad V (ChemStations, Inc., Houston, Tex.), to illustrate a prior art two-stage membrane separation process. The process was assumed to be carried out as shown in FIG. 9. Referring to this figure, raw gas stream 901 is mixed with recycle stream 904 to form combined stream 902. Stream 902 is compressed in compressor 909 and emerges as compressed gas stream 903. The compressed gas is passed to first heat exchange step 911, which produces cooler stream 906, and second heat exchange step 912, which produces yet cooler stream 905. This stream is passed as the feed stream to membrane separation unit 913, which was assumed to contain membranes as described above with respect to FIG. 1.

Residue stream 907 is sent to the fuel line or flared. Methane-enriched permeate stream 908 is passed to second membrane separation unit 914, which was assumed to contain the same membranes as in unit 913. Second membrane residue stream 904 is used as coolant in heat exchanger 911, then is recycled to the front of the process for further methane recovery. Second membrane permeate stream 910 is used as coolant in heat exchanger 912, and is withdrawn as the methane product.

The flow rate of the raw gas was assumed to be 5 MMscfd, and the gas was assumed to contain 85% methane and 15% nitrogen. The raw gas was assumed to be at 200 psia and 25° C., and to be compressed to 1,000 psia. The permeate side of the first membrane stage was assumed to be maintained at 450 psia, and the permeate side of the second membrane stage was assumed to be maintained at 200 psia. The calculations were performed to yield the highest quality product, in terms of low nitrogen content, consistent with practical amounts of membrane area and compressor horsepower. The stream numbers correspond to FIG. 9. The results of the calculations are summarized in Table 2.

TABLE 2

|  | Stream | | | | | | |
| --- | --- | --- | --- | --- | --- | --- | --- |
|  | 901 | 902 | 905 | 907 | 908 | 910 | 904 |
| Mass flow (lb/h) | 10,351 | 22,420 | 22,420 | 2,632 | 19,789 | 7,728 | 12,061 |
| Temp. (° C.) | 25 | 21 | 8 | −19 | −5 | −8 | −10 |
| Pressure (psia) | 200 | 200 | 1,000 | 1,000 | 450 | 200 | 450 |
| Component (mol %): | | | | | | | |
| Methane | 85.0 | 83.8 | 83.8 | 50.0 | 87.3 | 94.1 | 82.7 |
| Nitrogen | 15.0 | 16.2 | 16.2 | 50.0 | 12.7 | 5.9 | 17.3 |
| Component (lb/h) | | | | | | | |
| Methane | 7,913 | 16,749 | 16,749 | 958 | 15,791 | 6,962 | 16,749 |
| Nitrogen | 2,438 | 5,671 | 5,671 | 1,674 | 3,997 | 766 | 5,671 |

Membrane area = 2,206 + 1,730 m²
Theoretical horsepower = 997 hp

The process yielded 4 MMscfd of gas as permeate product stream 910, containing 6% nitrogen. Although such gas would not meet pipeline specification, it would be suitable for mixing with a low-nitrogen-content stream. To achieve even this relatively poor result, the process uses a total of nearly 4,000 m² of membrane area and nearly 1,000 compressor horsepower. Methane recovery is good, at 88%.

Example 2

Not in Accordance with the Invention

The calculation of Example 1 was repeated with a feed stream containing 80% methane and 20% nitrogen. All process conditions were as in Example 1. The stream numbers correspond to FIG. 9. The results of the calculations are summarized in Table 3.

TABLE 3

| | Stream | | | | | | |
|---|---|---|---|---|---|---|---|
| | 901 | 902 | 905 | 907 | 908 | 910 | 904 |
| Mass flow (lb/h) | 10,698 | 42,045 | 42,045 | 4,180 | 37,865 | 6,512 | 31,353 |
| Temp. (° C.) | 25 | 19 | 19 | −21 | −9 | −10 | −11 |
| Pressure (psia) | 200 | 200 | 1,000 | 1,000 | 500 | 200 | 500 |
| Component (mol %): | | | | | | | |
| Methane | 80.0 | 83.8 | 83.8 | 51.3 | 86.7 | 94.0 | 85.0 |
| Nitrogen | 20.0 | 16.2 | 16.2 | 49.7 | 13.3 | 6.0 | 15.0 |
| Component (lb/h) | | | | | | | |
| Methane | 7,447 | 31,443 | 31,443 | 1,573 | 29,870 | 5,863 | 24,008 |
| Nitrogen | 3,251 | 10,602 | 10,602 | 2,607 | 7,995 | 650 | 7,345 |

Membrane area = 4,600 + 1,180 m²
Theoretical horsepower = 1,854 hp

This time the process yielded only 3.4 MMscfd of gas as permeate product stream 910, again containing 6% nitrogen. Methane recovery is 79%, and the process uses a total of more than 5,700 m² of membrane area and more than 1,800 compressor horsepower.

Example 3

Not in Accordance with the Invention

The calculation of Example 1 was repeated, except that the second-stage residue stream, 904, was assumed to be withdrawn instead of recycled to the front of the process.

The flow rate of the raw gas was again assumed to be 5 MMscfd, and the gas was assumed to contain 85% methane and 15% nitrogen. The raw gas was assumed to be at 200 psia and 25° C., and to be compressed to 1,000 psia. The permeate side of the first membrane stage was assumed to be maintained at 500 psia, and the permeate side of the second membrane stage was assumed to be maintained at 200 psia. The calculations were again performed to yield the highest quality product, in terms of low nitrogen content, consistent with practical amounts of membrane area and compressor horsepower. The stream numbers correspond to FIG. 9. The results of the calculations are summarized in Table 4.

TABLE 4

| | Stream | | | | | |
|---|---|---|---|---|---|---|
| | 901 | 905 | 907 | 908 | 910 | 904 |
| Mass flow (lb/h) | 10,351 | 10,351 | 1,233 | 9,118 | 8,185 | 933 |
| Temp. (° C.) | 25 | −20 | −51 | −36 | −48 | −60 |
| Pressure (psia) | 200 | 1,000 | 1,000 | 500 | 200 | 500 |
| Component (mol %): | | | | | | |
| Methane | 85.0 | 85 | 50.0 | 88.7 | 92.1 | 50.0 |
| Nitrogen | 15.0 | 15 | 50.0 | 11.3 | 7.9 | 50.0 |
| Component (lb/h) | | | | | | |
| Methane | 7,913 | 7,913 | 449 | 7,464 | 7,124 | 340 |
| Nitrogen | 2,438 | 2,438 | 784 | 1,654 | 1,061 | 593 |

Membrane area = 1,187 + 1,648 m²
Theoretical horsepower = 469 hp

This time the process yielded 4.1 MMscfd of gas as permeate product stream 910, containing 8% nitrogen. As in Examples 1 and 2, the two-stage process had difficulty producing a product gas of low nitrogen content. Although such gas would not meet pipeline specification, it would be suitable for mixing with a low-nitrogen-content stream. This process uses a total of nearly 2,900 m² of membrane area and nearly 500 compressor horsepower. Methane recovery is 90%.

Example 4

Not in Accordance with the Invention

The calculation of Example 3 was repeated, except that the pressure ratios across the membranes were assumed to be increased by lowering the pressure on the permeate side, to reduce the nitrogen content of the product gas. The permeate side of the first membrane stage was assumed to be maintained at 350 psia, and the permeate side of the second membrane stage was assumed to be maintained at 100 psia. The process was assumed to include a second compressor in product line 910 after the heat exchange step, to boost the product delivery pressure back to 200 psia. All other process conditions were as in Example 3. The stream numbers correspond to FIG. 9. The results of the calculations are summarized in Table 5.

TABLE 5

| | Stream | | | | | |
|---|---|---|---|---|---|---|
| | 901 | 905 | 907 | 908 | 910 | 904 |
| Mass flow (lb/h) | 10,351 | 10,351 | 1,750 | 8,601 | 7,735 | 866 |
| Temp. (° C.) | 25 | −13 | −50 | −32 | −42 | −52 |
| Pressure (psia) | 200 | 1,000 | 1,000 | 350 | 100 | 350 |
| Component (mol %): | | | | | | |
| Methane | 85.0 | 85 | 50.0 | 90.6 | 94.0 | 50.0 |
| Nitrogen | 15.0 | 15 | 50.0 | 9.4 | 6.0 | 50.0 |
| Component (lb/h) | | | | | | |
| Methane | 7,913 | 7,913 | 637 | 7,276 | 6,960 | 315 |
| Nitrogen | 2,438 | 2,438 | 1,113 | 1,326 | 775 | 551 |

Membrane area = 828 + 1,786 m²
Theoretical horsepower = 469 + 144 hp to recompress stream 910 to 200 psia This time the process yielded 4 MMscfd of gas as permeate product stream 910, now containing 6% nitrogen. This process uses a total of about 2,600 m² of membrane area, about 10% less than in Example 3, but uses more than 600 compressor horsepower, about 20% more than in Example 3. Methane recovery is 88%.

All of these two-stage membrane process configurations (Examples 1–4) have difficulty achieving acceptably low nitrogen content in the permeate product stream, and, even to reduce the nitrogen content to 6% or 8%, use very large amounts of membrane area, 2,500–4,000 m². The design of Example 4 is particularly unattractive because not only does it use large amounts of membrane area, but it also used two pieces of rotating equipment.

Example 5

Process in Accordance with the Invention

A computer calculation was performed to illustrate the process of the invention, using a two-step membrane separation process. The process was assumed to be carried out as shown in FIG. 2. The flow rate of the raw gas was assumed to be 5 MMscfd, and the gas was assumed to contain 85% methane and 15% nitrogen. The raw gas was assumed to be at 200 psia and 25° C., and to be compressed to 1,000 psia before processing. The permeate pressure for both membrane separation steps was assumed to be 200 psia. The calculation was run to achieve a direct comparison with the calculation of Example 1, that is, 6% nitrogen in the product stream and 88% methane recovery. The stream numbers correspond to FIG. 2. The results of the calculations are summarized in Table 6.

The process yielded 4 MMscfd of gas as permeate product stream 209, containing 6% nitrogen as in Example 1. The process recovers 88% of the methane contained in feed stream 201. In this case, however, the process uses only 917 m² of membrane area and only 680 compressor hp. This represents less than one-quarter of the membrane area and about two-thirds of the compressor horsepower requirement of the comparable prior art process of Example 1.

Example 6

Process in Accordance with the Invention

The calculation of Example 5 was repeated with a feed stream containing 80% methane and 20% nitrogen, to provide a direct comparison with Example 2. All process conditions were as in Example 5. The stream numbers correspond to FIG. 2. The results of the calculations are summarized in Table 7.

TABLE 6

|  | Stream | | | | | | | |
| --- | --- | --- | --- | --- | --- | --- | --- | --- |
|  | 201 | 200 | 203 | 207 | 209 | 210 | 212 | 213 |
| Mass flow (lb/h) | 10,351 | 15,090 | 15,090 | 15,090 | 7,750 | 7,340 | 4,738 | 2,602 |
| Temp. (° C.) | 25 | 21 | 30 | 7 | −2 | −11 | −27 | −42 |
| Pressure (psia) | 200 | 200 | 1,000 | 1,000 | 200 | 1,000 | 200 | 1,000 |
| Component (mol %): | | | | | | | | |
| Methane | 85.0 | 86.2 | 86.2 | 86.2 | 94.0 | 77.0 | 88.8 | 49.8 |
| Nitrogen | 15.0 | 13.8 | 13.8 | 13.8 | 6.0 | 23.0 | 11.2 | 50.2 |
| Component (lb/h) | | | | | | | | |
| Methane | 7,913 | 11,794 | 11,794 | 11,794 | 6,971 | 4,823 | 3,880 | 943 |
| Nitrogen | 2,438 | 3,296 | 3,296 | 3,296 | 779 | 2,518 | 858 | 1,659 |

Membrane area = 532 + 385 m²
Theoretical horsepower = 680 hp

TABLE 7

|  | Stream | | | | | | | |
| --- | --- | --- | --- | --- | --- | --- | --- | --- |
|  | 201 | 200 | 203 | 207 | 209 | 210 | 212 | 213 |
| Mass flow (lb/h) | 10,698 | 21,207 | 21,207 | 21,207 | 6,694 | 14,512 | 10,511 | 4,001 |
| Temp. (° C.) | 25 | 21 | 30 | 6 | 1 | −3 | −21 | −38 |
| Pressure (psia) | 200 | 200 | 1,000 | 1,000 | 200 | 1,000 | 200 | 1,000 |
| Component (mol %): | | | | | | | | |
| Methane | 80.0 | 85.2 | 85.2 | 85.2 | 94.0 | 80.7 | 90.1 | 49.0 |
| Nitrogen | 20.0 | 14.8 | 14.8 | 14.8 | 6.0 | 19.3 | 9.9 | 51.0 |
| Component (lb/h) | | | | | | | | |
| Methane | 7,447 | 16,269 | 16,269 | 16,269 | 6,024 | 10,244 | 8,826 | 1,418 |
| Nitrogen | 3,251 | 4,938 | 4,938 | 4,938 | 670 | 4,268 | 1,685 | 2,583 |

Membrane area = 455 + 830 m²
Theoretical horsepower = 950 hp

This time the process yielded only 3.4 MMscfd of gas as permeate product stream 209, again containing 6% nitrogen, and recovered 81% of the methane contained in feed stream 201, slightly higher than the recovery achievable with the configuration of Example 2. In this case, however, the process of the invention uses 1,285 m² of membrane area and 950 compressor hp. This represents less than one-quarter of the membrane area and only one-half of the compressor horsepower requirement of the comparable prior art process of Example 2.

Examples 7–14

Effect of Process Operating Pressure

A series of calculations was performed to illustrate the effect of varying the process operating pressure on membrane area, compressor horsepower, and resulting capital costs for a system according to the process of the invention. The process was assumed to be carried out as shown in FIG. 3. The flow rate of the raw gas was assumed to be 5 MMscfd, and the gas was assumed to contain 83% methane and 17% nitrogen. The raw gas was assumed to be at 200 psia and 25° C., and to be compressed in compressor 302 to a processing pressure ranging from 500 psia to 1,200 psia. The permeate pressure for the first and second membrane separation steps, 308 and 311, was assumed to be 200 psia.

The calculations were run in each case to produce a methane product, stream 309, containing 4% nitrogen, and a second residue stream, 313, containing about 50% nitrogen. A third membrane separation step, 314, containing about 100 m² of membrane, was assumed to be used in each case to fractionate the second residue stream, 313, into a methane-rich stream, 315, suitable for use as engine fuel, and a nitrogen-rich stream, 316, suitable for reinjection or flare.

Example 7

A calculation was performed using a processing pressure of 500 psia. The stream numbers correspond to FIG. 3. The results of the calculations are summarized in Table 8.

TABLE 8

| | Stream | | | | | | | | |
|---|---|---|---|---|---|---|---|---|---|
| | 301 | 300 | 307 | 309 | 310 | 312 | 313 | 315 | 316 |
| Molar flow (lbmol/h) | 580 | 3,501 | 3,501 | 416 | 3,085 | 2,921 | 164 | 33.3 | 131 |
| Mass flow (lb/h) | 10,490 | 60,269 | 60,269 | 6,875 | 53,394 | 49,780 | 3,615 | 632 | 2,983 |
| Temp. (° C.) | 25 | 23 | 9 | 8 | 7 | −2 | −11 | −12 | −14 |
| Pressure (psia) | 200 | 200 | 500 | 200 | 500 | 200 | 500 | 50 | 500 |
| Component (mol %): | | | | | | | | | |
| Methane | 83.0 | 90.2 | 90.2 | 96.0 | 89.4 | 91.7 | 50.0 | 75.6 | 43.5 |
| Nitrogen | 17.0 | 9.8 | 9.8 | 4.0 | 10.6 | 8.3 | 50.0 | 24.4 | 56.5 |

Membrane area = 1,212 + 9,499 + 100 m²
Theoretical horsepower = 1,464 hp

Example 8

A calculation was performed using a processing pressure of 600 psia. The stream numbers correspond to FIG. 3. The results of the calculations are summarized in Table 9.

TABLE 9

| | Stream | | | | | | | | |
|---|---|---|---|---|---|---|---|---|---|
| | 301 | 300 | 307 | 309 | 310 | 312 | 313 | 315 | 316 |
| Molar flow (lbmol/h) | 580 | 2,563 | 2,563 | 419 | 2,143 | 1,981 | 163 | 40.5 | 122 |
| Mass flow (lb/h) | 10,490 | 44,356 | 44,356 | 6,933 | 37,422 | 33,836 | 3,587 | 770 | 2,817 |
| Temp. (° C.) | 25 | 22 | 3 | 2 | 1 | −12 | −24 | −26 | −29 |
| Pressure (psia) | 200 | 200 | 600 | 200 | 600 | 200 | 600 | 50 | 600 |
| Component (mol %): | | | | | | | | | |
| Methane | 83.0 | 89.4 | 89.4 | 95.9 | 88.2 | 91.3 | 50.0 | 75.3 | 41.6 |
| Nitrogen | 17.0 | 10.6 | 10.6 | 4.1 | 11.8 | 8.7 | 50.0 | 24.7 | 58.4 |

Membrane area = 919 + 4,870 + 100 m²
Theoretical horsepower = 1,310 hp

Example 9

A calculation was performed using a processing pressure of 700 psia. The stream numbers correspond to FIG. 3. The results of the calculations are summarized in Table 10.

TABLE 10

| | Stream | | | | | | | | |
|---|---|---|---|---|---|---|---|---|---|
| | 301 | 300 | 307 | 309 | 310 | 312 | 313 | 315 | 316 |
| Molar flow (lbmol/h) | 580 | 2,282 | 2,282 | 423 | 1,859 | 1,702 | 158 | 46.5 | 111 |
| Mass flow (lb/h) | 10,490 | 39,565 | 39,565 | 6,990 | 32,575 | 29,070 | 3,505 | 893 | 2,612 |
| Temp. (° C.) | 25 | 21 | −3 | −4 | −6 | −22 | −37 | −42 | −46 |
| Pressure (psia) | 200 | 200 | 700 | 200 | 700 | 200 | 700 | 50 | 700 |
| Component (mol %): | | | | | | | | | |
| Methane | 83.0 | 89.2 | 89.2 | 95.9 | 87.7 | 91.3 | 48.5 | 73.7 | 37.9 |
| Nitrogen | 17.0 | 10.8 | 10.8 | 4.1 | 12.3 | 8.7 | 51.5 | 26.3 | 62.1 |

Membrane area = 740 + 3,348 + 100 m²
Theoretical horsepower = 1,351 hp

Example 10

A calculation was performed using a processing pressure of 800 psia. The stream numbers correspond to FIG. 3. The results of the calculations are summarized in Table 11.

TABLE 11

| | Stream | | | | | | | | |
|---|---|---|---|---|---|---|---|---|---|
| | 301 | 300 | 307 | 309 | 310 | 312 | 313 | 315 | 316 |
| Molar flow (lbmol/h) | 580 | 2,054 | 2,054 | 425 | 1,629 | 1,473 | 155 | 52.7 | 103 |
| Mass flow (lb/h) | 10,490 | 35,692 | 35,692 | 7,030 | 28,662 | 25,199 | 3,463 | 1,019 | 2,445 |
| Temp. (° C.) | 25 | 20 | −8 | −10 | −13 | −32 | −52 | −58 | −64 |
| Pressure (psia) | 200 | 200 | 800 | 200 | 800 | 200 | 800 | 50 | 800 |
| Component (mol %): | | | | | | | | | |
| Methane | 83.0 | 88.8 | 88.8 | 95.9 | 87.0 | 91.1 | 47.8 | 72.6 | 35.1 |
| Nitrogen | 17.0 | 11.2 | 11.2 | 4.1 | 13.0 | 8.9 | 52.2 | 27.4 | 64.9 |

Membrane area = 621 + 2,425 + 100 m²
Theoretical horsepower = 1,365 hp

Example 11

A calculation was performed using a processing pressure of 1,000 psia. The stream numbers correspond to FIG. 3. The results of the calculations are summarized in Table 12.

TABLE 12

| | Stream | | | | | | | | |
|---|---|---|---|---|---|---|---|---|---|
| | 301 | 300 | 307 | 309 | 310 | 312 | 313 | 315 | 316 |
| Molar flow (lbmol/h) | 580 | 1,824 | 1,824 | 417 | 1,407 | 1,243 | 164 | 67.7 | 96.3 |
| Mass flow (lb/h) | 10,490 | 31,719 | 31,719 | 6,884 | 24,835 | 21,223 | 3,612 | 1,301 | 2,311 |
| Temp. (° C.) | 25 | 20 | −12 | −16 | −19 | −45 | −71 | −82 | −93 |
| Pressure (psia) | 200 | 200 | 1,000 | 200 | 1,000 | 200 | 1,000 | 50 | 1,000 |
| Component (mol %): | | | | | | | | | |
| Methane | 83.0 | 88.8 | 88.8 | 96.0 | 86.6 | 91.4 | 50.0 | 73.4 | 33.6 |
| Nitrogen | 17.0 | 11.2 | 11.2 | 4.0 | 13.4 | 8.6 | 50.0 | 26.6 | 66.4 |

Membrane area = 455 + 1,524 + 100 m²
Theoretical horsepower = 1,444 hp

Example 12

A calculation was performed using a processing pressure of 1,100 psia. The stream numbers correspond to FIG. 3. The results of the calculations are summarized in Table 13.

TABLE 13

| | Stream | | | | | | | | |
|---|---|---|---|---|---|---|---|---|---|
| | 301 | 300 | 307 | 309 | 310 | 312 | 313 | 315 | 316 |
| Molar flow (lbmol/h) | 580 | 1,753 | 1,753 | 414 | 1,338 | 1,173 | 166 | 74.3 | 91.3 |
| Mass flow (lb/h) | 10,490 | 30,486 | 30,486 | 6,844 | 23,642 | 20,000 | 3,642 | 1,433 | 2,209 |
| Temp. (° C.) | 25 | 19 | −14 | −18 | −22 | −50 | −79 | −92 | −105 |
| Pressure (psia) | 200 | 200 | 1,100 | 200 | 1,100 | 200 | 1,100 | 50 | 1,100 |
| Component (mol %): | | | | | | | | | |
| Methane | 83.0 | 88.7 | 88.7 | 96.0 | 86.4 | 91.5 | 50.3 | 73.0 | 31.8 |
| Nitrogen | 17.0 | 11.3 | 11.3 | 4.0 | 13.6 | 8.5 | 49.7 | 27.0 | 68.2 |

Membrane area = 402 + 1,274 + 100 m$^2$
Theoretical horsepower = 1,486 hp

Example 13

A calculation was performed using a processing pressure of 1,200 psia. The stream numbers correspond to FIG. 3. The results of the calculations are summarized in Table 14.

TABLE 14

| | Stream | | | | | | | | |
|---|---|---|---|---|---|---|---|---|---|
| | 301 | 300 | 307 | 309 | 310 | 312 | 313 | 315 | 316 |
| Molar flow (lbmol/h) | 580 | 1,692 | 1,692 | 416 | 1,276 | 1,112 | 164 | 80.0 | 84.0 |
| Mass flow (lb/h) | 10,490 | 29,469 | 29,469 | 6,879 | 22,590 | 18,978 | 3,612 | 1,552 | 2,060 |
| Temp. (° C.) | 25 | 19 | −15 | −19 | −24 | −55 | −85 | −101 | −117 |
| Pressure (psia) | 200 | 200 | 1,200 | 200 | 1,200 | 200 | 1,200 | 50 | 1,200 |
| Component (mol %): | | | | | | | | | |
| Methane | 83.0 | 88.5 | 88.5 | 96.0 | 86.1 | 91.4 | 50.0 | 71.9 | 29.1 |
| Nitrogen | 17.0 | 11.5 | 11.5 | 4.0 | 13.9 | 8.6 | 50.0 | 28.1 | 70.9 |

Membrane area = 364 + 1,091 + 100 m$^2$
Theoretical horsepower = 1,524 hp

Example 14

Figure 6:
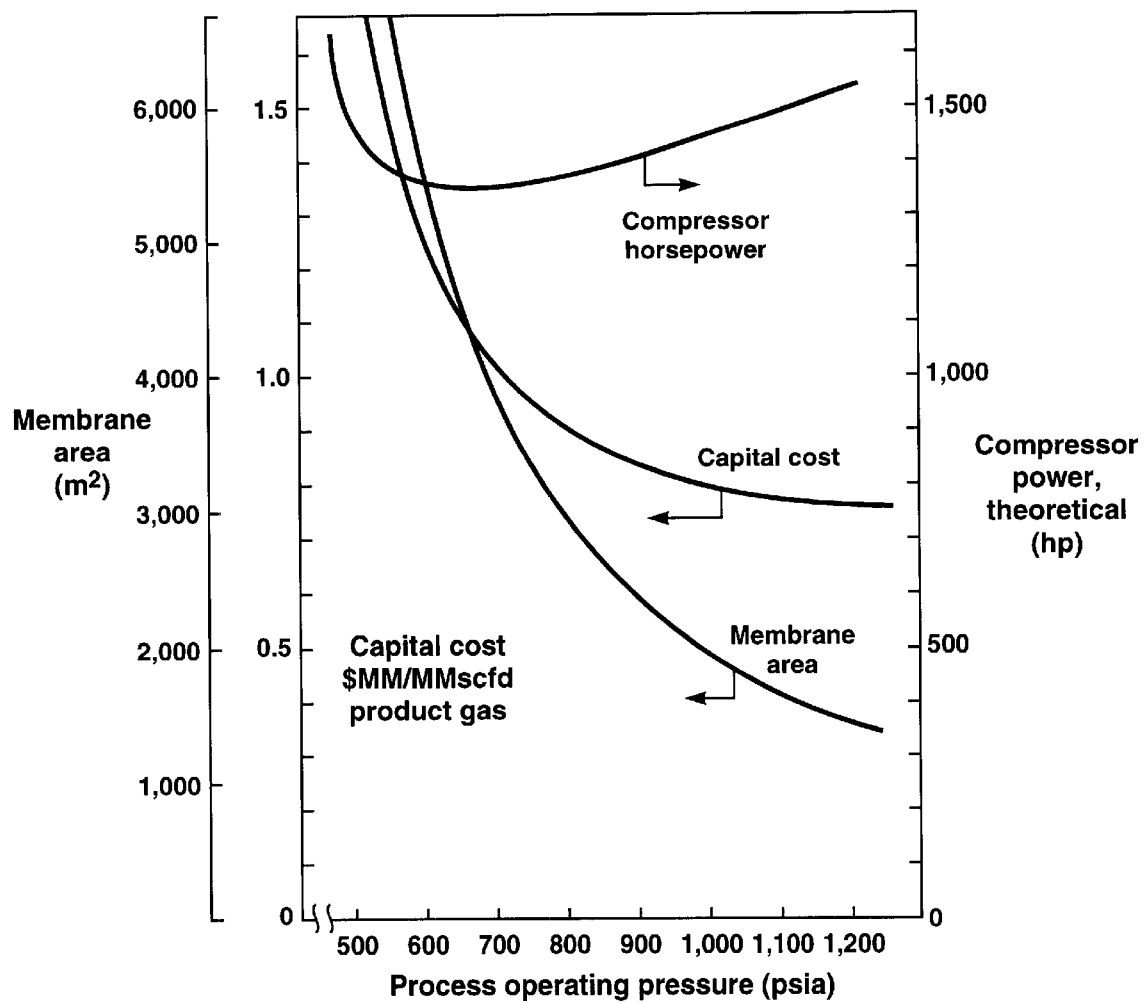
FIG. 6 is a graph showing the relationship between membrane area, compressor horsepower, capital cost and process operating pressure for the process of FIG. 3.

The results of Examples 7–13 are plotted graphically in FIG. 6. In all cases, the process produces about 3.6 MMscfd of pipeline quality gas, and recovers approximately 83 mol% of the methane in the raw gas. As the process operating pressure increases, the membrane area required to perform the separation decreases. The compressor horsepower requirement is relatively low between about 500 psia and 1,000 psia, and passes through a minimum when the operating pressure is about 600 psia.

However, as a result of the decreasing membrane area requirement, the overall capital cost of the membrane nitrogen removal system continues to decrease at operating pressures above 600 psia, and remains roughly constant at a broad minimum over the pressure range 800–1,200 psia. Thereafter, as operating pressure is increased beyond about 1,500 psia, the capital cost will start to rise again because of high compressor costs.

Examples 15–20

Effect of Raw Gas Pressure

A series of calculations was performed to illustrate the effect of varying raw gas pressure on membrane area, compressor horsepower, and resulting capital costs for a system according to the process of the invention. The process was assumed to be carried out as shown in FIG. 2. For simplicity, no heat integration calculations were included, so the calculated temperatures for the various streams are not representative of actual process conditions. The flow rate of the raw gas, stream 201, was assumed to be 5 MMscfd, the incoming raw gas temperature was assumed to be 25° C., and the gas was assumed to contain 81% methane and 19% nitrogen. The raw gas pressure ranged from 100 psia to 800 psia, and the raw gas was assumed to be compressed to 1,200 psia for processing. The calculations were performed to yield a product gas stream, 209, containing 4% nitrogen and a second residue stream, 213, containing about 55% nitrogen. Further, the calculations were performed to yield the same degree of methane recovery, about 83%, in each case.

Example 15

A calculation was performed using a raw gas pressure of 100 psia. The stream numbers correspond to FIG. 2. The results of the calculations are summarized in Table 15.

TABLE 15

| | Stream | | | | | | |
|---|---|---|---|---|---|---|---|
| | 201 | 200 | 207 | 209 | 210 | 212 | 213 |
| Molar flow (lbmol/h) | 580 | 1,726 | 1,726 | 408 | 1,319 | 1,146 | 172 |
| Mass flow (lb/h) | 10,629 | 30,209 | 30,209 | 6,738 | 23,470 | 19,580 | 3,891 |
| Temp. (° C.) | 25 | 31 | 60 | 57 | 54 | 35 | 15 |
| Pressure (psia) | 100 | 100 | 1,200 | 100 | 1,200 | 100 | 1,200 |
| Component (mol %): | | | | | | | |
| Methane | 81.0 | 87.8 | 87.8 | 96.0 | 85.3 | 91.3 | 45.4 |
| Nitrogen | 19.0 | 12.2 | 12.2 | 4.0 | 14.7 | 8.7 | 54.6 |

Membrane area = 324 + 1,025 + 100 m$^2$
Theoretical horsepower = 2,447 hp

Example 16

A calculation was performed using a raw gas pressure of 200 psia. The stream numbers correspond to FIG. 2. The results of the calculations are summarized in Table 16.

TABLE 16

| | Stream | | | | | | |
|---|---|---|---|---|---|---|---|
| | 201 | 200 | 207 | 209 | 210 | 212 | 213 |
| Molar flow (lbmol/h) | 580 | 1,893 | 1,893 | 405 | 1,488 | 1,313 | 175 |
| Mass flow (lb/h) | 10,629 | 33,114 | 33,114 | 6,683 | 26,431 | 22,485 | 3,946 |
| Temp. (° C.) | 25 | 33 | 60 | 57 | 54 | 37 | 19 |
| Pressure (psia) | 200 | 200 | 1,200 | 100 | 1,200 | 200 | 1,200 |
| Component (mol %): | | | | | | | |
| Methane | 81.0 | 87.9 | 87.9 | 96.1 | 85.6 | 90.9 | 46.2 |
| Nitrogen | 19.0 | 12.1 | 12.1 | 3.9 | 14.4 | 9.1 | 53.8 |

Membrane area = 321 + 1,303 + 100 m$^2$
Theoretical horsepower = 1,789 hp

Example 17

A calculation was performed using a raw gas pressure of 400 psia. The stream numbers correspond to FIG. 2. The results of the calculations are summarized in Table 17.

TABLE 17

| | Stream | | | | | | |
|---|---|---|---|---|---|---|---|
| | 201 | 200 | 207 | 209 | 210 | 212 | 213 |
| Molar flow (lbmol/h) | 580 | 2,493 | 2,493 | 406 | 2,087 | 1,913 | 174 |
| Mass flow (lb/h) | 10,629 | 43,677 | 43,677 | 6,702 | 36,974 | 33,048 | 3,927 |
| Temp. (° C.) | 25 | 38 | 60 | 58 | 56 | 42 | 28 |
| Pressure (psia) | 400 | 400 | 1,200 | 100 | 1,200 | 400 | 1,200 |
| Component (mol %): | | | | | | | |
| Methane | 81.0 | 87.7 | 87.7 | 96.1 | 86.0 | 89.7 | 45.8 |
| Nitrogen | 19.0 | 12.3 | 12.3 | 3.9 | 14.0 | 10.3 | 51.2 |

Membrane area = 322 + 2,444 + 100 m$^2$
Theoretical horsepower = 1,337 hp

Example 18

A calculation was performed using a raw gas pressure of 600 psia. The stream numbers correspond to FIG. 2. The results of the calculations are summarized in Table 18.

TABLE 18

| | Stream | | | | | | |
|---|---|---|---|---|---|---|---|
| | 201 | 200 | 207 | 209 | 210 | 212 | 213 |
| Molar flow (lbmol/h) | 580 | 4,190 | 4,190 | 410 | 3,781 | 3,610 | 171 |
| Mass flow (lb/h) | 10,629 | 73,728 | 73,728 | 6,768 | 66,960 | 63,100 | 3,860 |
| Temp. (° C.) | 25 | 44 | 60 | 59 | 57 | 47 | 36 |
| Pressure (psia) | 600 | 600 | 1,200 | 100 | 1,200 | 600 | 1,200 |
| Component (mol %): | | | | | | | |
| Methane | 81.0 | 87.0 | 87.0 | 96.0 | 86.1 | 88.0 | 45.0 |
| Nitrogen | 19.0 | 13.0 | 13.0 | 4.0 | 13.9 | 12.0 | 55.0 |

Membrane area = 325 + 6,384 + 100 m$^2$
Theoretical horsepower = 1,362 hp

Example 19

A calculation was performed using a raw gas pressure of 800 psia. The stream numbers correspond to FIG. 2. The results of the calculations are summarized in Table 19.

TABLE 19

| | Stream | | | | | | |
|---|---|---|---|---|---|---|---|
| | 201 | 200 | 207 | 209 | 210 | 212 | 213 |
| Molar flow (lbmol/h) | 580 | 12,213 | 12,213 | 411 | 11,802 | 11,632 | 171 |
| Mass flow (lb/b) | 10,629 | 215,260 | 215,260 | 6,782 | 208,478 | 204,615 | 3,863 |
| Temp. (° C.) | 25 | 51 | 60 | 60 | 59 | 52 | 45 |
| Pressure (psia) | 800 | 800 | 1,200 | 100 | 1,200 | 800 | 1,200 |
| Component (mol %): | | | | | | | |
| Methane | 81.0 | 86.8 | 86.8 | 96.0 | 86.5 | 87.1 | 45.0 |
| Nitrogen | 19.0 | 13.2 | 13.2 | 4.0 | 13.5 | 12.9 | 55.0 |

Membrane area = 326 + 31,493 + 100 m$^2$
Theoretical horsepower = 2,276 hp

Example 20

Figure 7:
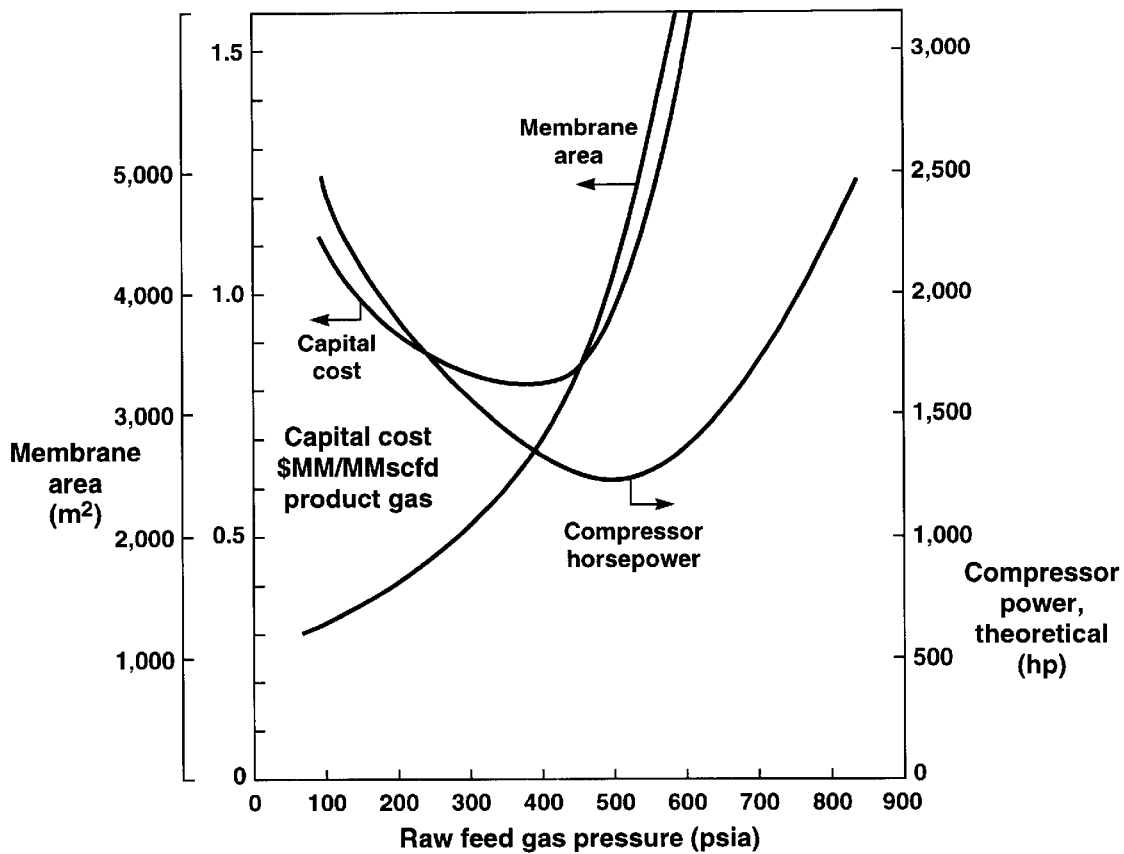
FIG. 7 is a graph showing the relationship between membrane area, compressor horsepower, capital cost and raw gas pressure for the process of FIG. 2.

The results of Examples 15–19 are plotted graphically in FIG. 7. In all cases, the process produces about 3.5 MMscfd of pipeline quality gas, and recovers approximately 83 mol% of the methane in the raw gas. As the raw gas pressure increases, the membrane area required to treat the gas also increases. The compressor horsepower requirement is low in the raw gas pressure range about 400–700 psia, and passes through a minimum when the raw gas pressure is about 500 psia. The overall capital cost of the membrane nitrogen removal system also passes though a minimum range between about 200–500 psia. Both the required compressor horsepower capacity and the system costs increase rapidly above the optimum range. This is because the pressure ratio across the second membrane step falls as the raw gas pressure increases, leading to more gas recycle, and hence to increased compression and membrane area requirements.

Examples 21–24

A series of calculations was performed to illustrate an embodiment of the invention in which the raw gas is already at high pressure and needs only modest compression before processing. The process was assumed to be carried out as shown in FIG. 4, using a multistage compressor in which gas can be introduced into a lower-pressure zone, 402a, and a higher-pressure zone, 402b. The raw gas was assumed to be at an intermediate pressure and introduced as stream 401 into zone 402b, where it was assumed to be compressed to 1,100 psia. The flow rate of the raw gas was assumed to be 5 MMscfd, the temperature was assumed to be 25° C., and the gas was assumed to contain 84% methane and 16% nitrogen. The calculations were run to yield a product gas stream, 406, containing 4% nitrogen, a second residue stream, 410, containing 55% nitrogen, and a methane recovery of 87%.

Example 21

For comparison, a base calculation was performed using a raw gas pressure of 200 psia. In this case, since both raw gas stream 401 and recycle gas stream 409 are at 200 psia, a single-stage compressor with a single intake can be used as in FIGS. 1–3. The stream numbers correspond to FIG. 4. The results of the calculations are summarized in Table 20.

TABLE 20

| | Stream | | | | | | | |
|---|---|---|---|---|---|---|---|---|
| | 401 | 403 | 400 | 404 | 406 | 407 | 409 | 410 |
| Molar flow (lbmol/h) | 580 | 1,106 | 1,686 | 1,686 | 444 | 1,242 | 1,106 | 136 |
| Mass flow (lb/h) | 10,420 | 18,983 | 29,404 | 29,404 | 7,333 | 22,071 | 18,983 | 3,087 |
| Temp. (° C.) | 25 | 38 | 33 | 60 | 57 | 54 | 38 | 21 |
| Pressure (psia) | 200 | 200 | 200 | 1,100 | 150 | 1,100 | 200 | 1,100 |
| Component (mol %): | | | | | | | | |
| Methane | 84.0 | 90.6 | 88.4 | 88.4 | 96.0 | 85.6 | 90.6 | 45.0 |
| Nitrogen | 16.0 | 9.4 | 11.6 | 11.6 | 4.0 | 14.4 | 9.4 | 55.0 |

Membrane area = 408 + 1,228 m$^2$
Theoretical horsepower = 0 + 1,500 hp

Example 22

A calculation was performed using a raw gas pressure of 600 psia. The stream numbers correspond to FIG. 4. The results of the calculations are summarized in Table 21.

TABLE 21

| | Stream | | | | | | | |
|---|---|---|---|---|---|---|---|---|
| | 401 | 403 | 400 | 404 | 406 | 407 | 409 | 410 |
| Molar flow (lbmol/h) | 580 | 1,106 | 1,686 | 1,686 | 444 | 1,242 | 1,106 | 136 |
| Mass flow (lb/h) | 10,420 | 18,983 | 29,404 | 29,404 | 7,333 | 22,071 | 18,983 | 3,087 |
| Temp (° C.) | 25 | 126 | 92 | 60 | 57 | 54 | 38 | 21 |
| Pressure (psia) | 600 | 600 | 600 | 1,100 | 150 | 1,100 | 200 | 1,100 |
| Component (mol %): | | | | | | | | |
| Methane | 84.0 | 90.6 | 88.4 | 88.4 | 96.0 | 85.6 | 90.6 | 45.0 |
| Nitrogen | 16.0 | 9.4 | 11.6 | 11.6 | 4.0 | 14.4 | 9.4 | 55.0 |

Membrane area = 408 + 1,228 m$^2$
Theoretical horsepower = 595 + 556 hp

Example 23

A calculation was performed using a raw gas pressure of 800 psia. The stream numbers correspond to FIG. 4. The results of the calculations are summarized in Table 22.

TABLE 22

| | Stream | | | | | | | |
|---|---|---|---|---|---|---|---|---|
| | 401 | 403 | 400 | 404 | 406 | 407 | 409 | 410 |
| Molar flow (lbmol/h) | 580 | 1,021 | 1,601 | 1,601 | 445 | 1,156 | 1,021 | 135 |
| Mass flow (lb/h) | 10,420 | 17,563 | 27,982 | 27,982 | 7,363 | 20,619 | 17,563 | 3,056 |
| Temp. (° C.) | 25 | 151 | 107 | 60 | 57 | 54 | 38 | 22 |
| Pressure (psia) | 800 | 800 | 800 | 1,100 | 150 | 1,100 | 200 | 1,100 |
| Component (mol %): | | | | | | | | |
| Methane | 84.0 | 90.3 | 88.0 | 88.0 | 95.8 | 85.0 | 90.3 | 45.0 |
| Nitrogen | 16.0 | 9.7 | 12.0 | 12.0 | 4.2 | 15.0 | 9.7 | 55.0 |

Membrane area = 411 + 1,143 m$^2$
Theoretical horsepower = 719 + 279 hp

Example 24

Table 23 compares the compressor horsepower and membrane area requirements of the processes at varying raw gas pressures of Examples 21–23. In all cases, the process yielded about 3.8 MMscfd of pipeline quality gas containing 96% methane and 4% nitrogen.

TABLE 23

| Example | Raw Gas Pressure (psia) | Membrane Area (m²) | Total Compressor Horsepower |
| --- | --- | --- | --- |
| 21 | 200 | 1,636 | 1,500 |
| 22 | 600 | 1,636 | 1,151 |
| 23 | 800 | 1,554 | 997 |

As can be raw gas can be delivered at 800 psia, there is a significant savings in compressor horsepower required compared to the lower delivery pressures. There is also savings in the membrane area required, and even with this smaller membrane area, the product recovery is slightly higher (30 lb/h more) than in the lower-pressure examples.

Examples 25–27

A series of calculations was performed to illustrate an embodiment of the invention in which the raw gas is already pressure and needs no additional compression to processing pressure. The process was assumed to be carried out as shown in FIG. 5. The flow rate of the raw gas was assumed to be 5 MMscfd, the temperature was assumed to be 25° C., and the gas was assumed to contain 85% nitrogen. Permeate recycle stream 508, at a pressure of 200 psia, was assumed to be compressed in compressor 502 to match the pressure of the raw gas stream. The calculations were run to yield a product gas stream, 505, containing 4% nitrogen, a second residue stream, 509, containing 60% nitrogen, and a methane recovery of 90%.

Example 25

A calculation was performed using a raw gas pressure of 1,200 psia. The stream numbers correspond to FIG. 5. The results of the calculations are summarized in Table 24.

TABLE 24

| | Stream | | | | | | |
| --- | --- | --- | --- | --- | --- | --- | --- |
| | 501 | 500 | 503 | 505 | 506 | 508 | 509 |
| Molar flow (lbmol/h) | 580 | 1,144 | 1,724 | 466 | 1,258 | 1,144 | 114 |
| Mass flow (lb/h) | 10,351 | 19,650 | 29,994 | 7,695 | 22,298 | 19,650 | 2,648 |
| Temp. (° C.) | 25 | 185 | 60 | 57 | 54 | 35 | 16 |
| Pressure (psia) | 1,200 | 1,200 | 1,200 | 200 | 1,200 | 200 | 1,200 |
| Component (mol %): | | | | | | | |
| Methane | 85.0 | 90.5 | 88.7 | 96.0 | 85.9 | 90.5 | 40.0 |
| Nitrogen | 15.0 | 9.5 | 11.3 | 4.0 | 14.1 | 9.5 | 60.0 |

Membrane area = 407 + 1,146 m²
Theoretical horsepower = 1,085 hp

Example 26

A calculation was performed using a raw gas pressure of 1,500 psia. The stream numbers correspond to FIG. 5. The results of the calculations are summarized in Table 25.

TABLE 25

| | Stream | | | | | | |
| --- | --- | --- | --- | --- | --- | --- | --- |
| | 501 | 500 | 503 | 505 | 506 | 508 | 509 |
| Molar flow (lbmol/h) | 580 | 1,007 | 1,587 | 470 | 1,116 | 1,007 | 110 |
| Mass flow (lb/h) | 10,351 | 17,325 | 27,676 | 7,777 | 19,901 | 17,325 | 2,575 |
| Temp (° C.) | 25 | 197 | 60 | 56 | 51 | 27 | 3 |
| Pressure (psia) | 1,500 | 1,500 | 1,500 | 200 | 1,500 | 200 | 1,500 |
| Component (mol %): | | | | | | | |
| Methane | 85.0 | 90.2 | 88.3 | 95.9 | 85.1 | 90.5 | 38.2 |
| Nitrogen | 15.0 | 9.8 | 11.7 | 4.1 | 14.9 | 9.8 | 61.8 |

Membrane area = 317 + 781 m²
Theoretical horsepower = 1,078 hp

Example 27

Table 26 compares the compressor horsepower and membrane area requirements of the processes at the two raw gas pressures of Examples 25 and 26.

TABLE 26

| Example | Raw Gas Pressure (psia) | Membrane Area (m²) | Total Compressor Horsepower |
|---|---|---|---|
| 24 | 1,200 | 1,553 | 1,085 |
| 25 | 1,500 | 1,098 | 1,078 |

As can be seen in both cases, the compressor horsepower requirement is the same, and the process yields about 4 MMscfd of pipeline quality gas containing 96% methane and 4% nitrogen. However, if the raw gas can be delivered at 1,500 psia, there is a significant savings in membrane area required compared to the 1,200 psia delivery.

Examples 28–32

A series of calculations was performed to illustrate the process of the invention showing the effect of membrane selectivity on the efficiency of the process in terms of membrane area and compressor horsepower requirements. The process was assumed to be carried out as shown in FIG. 3. The flow rate of the raw gas was assumed to be 5 MMscfd, the temperature was assumed to be 25° C., and the gas was assumed to contain 85% methane and 15% nitrogen.

The raw gas was assumed to be at 300 psia and compressed to 1,500 psia in compressor 302. The process conditions were set to produce a product stream, 309, with 4% nitrogen, and a second residue stream, 313, with 60% nitrogen. Stream 313 was assumed to be subjected to further fractionation in the third membrane separation step, which produces two additional product streams: a methane-rich stream, 315, containing no more than about 40% nitrogen and useable as engine fuel, and a nitrogen-rich stream, 316, containing more than 60% nitrogen and suitable for reinjection. Product stream 309 is recovered at 100 psia, the second permeate at 300 psia, and the third permeate at 50 psia.

For simplicity, the calculations were performed without any heat integration assumptions, and a specific membrane selectivity was chosen for each calculation. Obviously, in a real process, the selectivity would be a function of the operating temperature of each membrane separation step.

Example 28

A calculation was performed assuming the use of a membrane having a methane/nitrogen selectivity of 2.5. The stream numbers correspond to FIG. 3. The results of the calculations are summarized in Table 27.

TABLE 27

| | Stream | | | | | | | | |
|---|---|---|---|---|---|---|---|---|---|
| | 301 | 300 | 307 | 309 | 310 | 312 | 313 | 315 | 316 |
| Molar flow (lbmol/h) | 580 | 7,417 | 7,417 | 466 | 6,950 | 6,837 | 114 | 34.2 | 79.7 |
| Mass flow (lb/h) | 10,351 | 126,902 | 126,902 | 7,704 | 119,198 | 116,553 | 2,645 | 721 | 1,925 |
| Temp. (° C.) | 25 | −1 | 30 | 29 | 28 | −3 | −35 | −42 | −49 |
| Pressure (psia) | 300 | 300 | 1,500 | 100 | 1,500 | 300 | 1,500 | 50 | 1,500 |
| Component (mol %): | | | | | | | | | |
| Methane | 85.0 | 91.1 | 91.1 | 96.0 | 90.8 | 91.6 | 40.0 | 58.0 | 32.2 |
| Nitrogen | 15.0 | 8.9 | 8.9 | 4.0 | 9.2 | 8.4 | 60.0 | 42.0 | 67.8 |

Membrane area = 275 + 5,005 + 30 m²
Theoretical horsepower = 5,397 hp

Example 29

A calculation was performed assuming the use of a membrane having a methane/nitrogen selectivity of 3. The stream numbers correspond to FIG. 3. The results of the calculations are summarized in Table 28.

TABLE 28

| | Stream | | | | | | | | |
|---|---|---|---|---|---|---|---|---|---|
| | 301 | 300 | 307 | 309 | 310 | 312 | 313 | 315 | 316 |
| Molar flow (lbmol/h) | 580 | 3,678 | 3,678 | 467 | 3,211 | 3,097 | 114 | 31.6 | 83.0 |
| Mass flow (lb/h) | 10,351 | 63,498 | 63,498 | 7,720 | 55,778 | 53,131 | 2,648 | 652 | 2,012 |
| Temp. (° C.) | 25 | 0 | 30 | 28 | 26 | −5 | −35 | −42 | −48 |
| Pressure (psia) | 300 | 300 | 1,500 | 100 | 1,500 | 300 | 1,500 | 50 | 1,500 |

TABLE 28-continued

|  | Stream | | | | | | | |
|---|---|---|---|---|---|---|---|---|
|  | 301 | 300 | 307 | 309 | 310 | 312 | 313 | 315 | 316 |
| Component (mol %): | | | | | | | | |
| Methane | 85.0 | 89.8 | 89.8 | 96.0 | 88.9 | 90.7 | 40.0 | 61.9 | 31.7 |
| Nitrogen | 15.0 | 10.2 | 10.2 | 4.0 | 11.1 | 9.3 | 60.0 | 38.1 | 68.3 |

Membrane area = 281 + 2,389 + 30 m$^2$
Theoretical horsepower = 2,695 hp

Example 30

A calculation was performed assuming the use of a membrane having a methane/nitrogen selectivity of 3.5. The stream numbers correspond to FIG. 3. The results of the calculations are summarized in Table 29.

Example 32

Table 31 compares the compressor horsepower and membrane area requirements and the product recoveries of the processes at the varying membrane selectivities of Examples 28–31. In each case, the process was set to produce three

TABLE 29

|  | Stream | | | | | | | |
|---|---|---|---|---|---|---|---|---|
|  | 301 | 300 | 307 | 309 | 310 | 312 | 313 | 315 | 316 |
| Molar flow (lbmol/h) | 580 | 2,259 | 2,259 | 472 | 1,788 | 1,673 | 114 | 29.8 | 84.8 |
| Mass flow (lb/h) | 10,351 | 39,295 | 39,295 | 7,796 | 31,498 | 28,850 | 2,648 | 602 | 2,060 |
| Temp. (° C.) | 25 | 2 | 30 | 26 | 22 | −6 | −35 | −42 | −48 |
| Pressure (psia) | 300 | 300 | 1,500 | 100 | 1,500 | 300 | 1,500 | 50 | 1,500 |
| Component (mol %): | | | | | | | | |
| Methane | 85.0 | 88.7 | 88.7 | 96.0 | 86.8 | 90.0 | 40.0 | 65.1 | 31.2 |
| Nitrogen | 15.0 | 11.3 | 11.3 | 4.0 | 13.2 | 10.0 | 60.0 | 34.9 | 68.8 |

Membrane area = 289 + 1,360 + 30 m$^2$
Theoretical horsepower = 1,668 hp

Example 31

A calculation was performed assuming the use of a membrane having a methane/nitrogen selectivity of 4. The stream numbers correspond to FIG. 3. The results of the calculations are summarized in Table 30.

streams: a pipeline quality natural gas product stream (309) containing 4% nitrogen; an engine fuel stream (315) containing no more than about 40% nitrogen; and a reinjection stream (316) containing more than 60% nitrogen. In all calculations, the process yields 4 MMscfd of pipeline quality gas, and achieves 90% methane recovery into that gas.

TABLE 30

|  | Stream | | | | | | | |
|---|---|---|---|---|---|---|---|---|
|  | 301 | 300 | 307 | 309 | 310 | 312 | 313 | 315 | 316 |
| Molar flow (lbmol/h) | 580 | 1,624 | 1,624 | 464 | 1,160 | 1,046 | 114 | 28.3 | 85.7 |
| Mass flow (lb/h) | 10,351 | 28,414 | 28,414 | 7,670 | 20,744 | 18,100 | 2,644 | 564 | 2,085 |
| Temp. (° C.) | 25 | 3 | 30 | 24 | 19 | −9 | −36 | −42 | −48 |
| Pressure (psia) | 300 | 300 | 1,500 | 100 | 1,500 | 300 | 1,500 | 50 | 1,500 |
| Component (mol %): | | | | | | | | |
| Methane | 85.0 | 87.9 | 87.9 | 96.0 | 84.6 | 89.5 | 40.0 | 67.8 | 30.8 |
| Nitrogen | 15.0 | 12.1 | 12.1 | 4.0 | 15.4 | 10.5 | 60.0 | 32.2 | 69.2 |

Membrane area = 290 + 895 + 30 m$^2$
Theoretical horsepower = 1,208 hp

TABLE 31

| Example # | Methane/ Nitrogen Selectivity | Membrane Area (m²) | Total Compressor Horsepower | Recycle Gas (lbmol/h) (Stream 312) | Fuel Gas Composition (%) (Stream 315) | | Reinjection Gas Composition (%) (Stream 316) | |
|---|---|---|---|---|---|---|---|---|
| | | | | | CH₄ | N₂ | CH₄ | N₂ |
| 28 | 2.5 | 5,310 | 5,397 | 6,837 | 58 | 42 | 32 | 68 |
| 29 | 3.0 | 2,700 | 2,695 | 3,097 | 62 | 38 | 32 | 68 |
| 30 | 3.5 | 1,679 | 1,668 | 1,673 | 65 | 35 | 31 | 69 |
| 31 | 4.0 | 1,215 | 1,208 | 1,046 | 68 | 32 | 31 | 69 |

As expected, the membrane area requirement decreases with increasing membrane selectivity. The volume flow of the recycle stream (312) also decreases with increasing membrane selectivity, with a resultant decrease in the compressor horsepower requirement.

Examples 33–37

The calculations of Examples 28–31 were repeated except that the process conditions were set to produce a second residue stream (stream 313) containing only 50% nitrogen. This stream was again assumed to be fractionated in a third membrane separation step. All other parameters were as in Examples 28–31.

A calculation was performed assuming the use of a membrane having a methane/nitrogen selectivity of 2.5. The stream numbers correspond to FIG. 3. The results of the calculations are summarized in Table 32.

TABLE 32

| | Stream | | | | | | | | |
|---|---|---|---|---|---|---|---|---|---|
| | 301 | 300 | 307 | 309 | 310 | 312 | 313 | 315 | 316 |
| Molar flow (lbmol/h) | 580 | 5,827 | 5,827 | 441 | 5,386 | 5,247 | 139 | 37.7 | 101 |
| Mass flow (lb/h) | 10,351 | 99,676 | 99,676 | 7,285 | 92,391 | 89,333 | 3,058 | 749 | 2,309 |
| Temp. (° C.) | 25 | 0 | 30 | 29 | 28 | −3 | −34 | −41 | −48 |
| Pressure (psia) | 300 | 300 | 1,500 | 100 | 1,500 | 300 | 1,500 | 50 | 1,500 |
| Component (mol %): | | | | | | | | | |
| Methane | 85.0 | 91.1 | 91.1 | 96.0 | 90.7 | 91.8 | 50.0 | 68.1 | 43.3 |
| Nitrogen | 15.0 | 8.9 | 8.9 | 4.0 | 9.3 | 8.2 | 50.0 | 31.9 | 56.7 |

Membrane area = 261 + 3,832 + 30 m²
Theoretical horsepower = 4,253 hp

Example 34

A calculation was performed assuming the use of a membrane having a methane/nitrogen selectivity of 3. The stream numbers correspond to FIG. 3. The results of the calculations are summarized in Table 33.

TABLE 33

| | Stream | | | | | | | | |
|---|---|---|---|---|---|---|---|---|---|
| | 301 | 300 | 307 | 309 | 310 | 312 | 313 | 315 | 316 |
| Molar flow (lbmol/h) | 580 | 2,878 | 2,878 | 441 | 2,436 | 2,297 | 139 | 35.5 | 103.0 |
| Mass flow (lb/h) | 10,351 | 49,634 | 49,634 | 7,289 | 42,345 | 39,284 | 3,061 | 691 | 2,370 |
| Temp. (° C.) | 25 | 2 | 30 | 27 | 25 | −4 | −33 | −40 | −46 |
| Pressure (psia) | 300 | 300 | 1,500 | 100 | 1,500 | 300 | 1,500 | 50 | 1,500 |
| Component (mol %): | | | | | | | | | |
| Methane | 85.0 | 89.9 | 89.9 | 96.0 | 88.8 | 91.2 | 50.0 | 71.6 | 42.6 |
| Nitrogen | 15.0 | 10.1 | 10.1 | 4.0 | 11.2 | 8.8 | 50.0 | 28.4 | 57.4 |

Membrane area = 265 + 1,758 + 30 m²
Theoretical horsepower = 2,121 hp

Example 35

A calculation was performed assuming the use of a membrane having a methane/nitrogen selectivity of 3.5. The stream numbers correspond to FIG. 3. The results of the calculations are summarized in Table 34.

TABLE 34

| | Stream | | | | | | | | |
|---|---|---|---|---|---|---|---|---|---|
| | 301 | 300 | 307 | 309 | 310 | 312 | 313 | 315 | 316 |
| Molar flow (lbmol/h) | 580 | 1,857 | 1,857 | 441 | 1,415 | 1,276 | 139 | 34.0 | 105 |
| Mass flow (lb/h) | 10,351 | 32,249 | 32,249 | 7,291 | 24,958 | 21,897 | 3,061 | 649 | 2,412 |
| Temp. (° C.) | 25 | 4 | 30 | 26 | 21 | −6 | −33 | −39 | −45 |
| Pressure (psia) | 300 | 300 | 1,500 | 100 | 1,500 | 300 | 1,500 | 50 | 1,500 |
| Component (mol %): | | | | | | | | | |
| Methane | 85.0 | 88.9 | 88.9 | 96.0 | 86.7 | 90.7 | 50.0 | 74.4 | 42.2 |
| Nitrogen | 15.0 | 11.1 | 11.1 | 4.0 | 13.3 | 9.3 | 50.0 | 25.6 | 57.8 |

Membrane area = 270 + 1,023 + 30 $m^2$
Theoretical horsepower = 1,381 hp

Example 36

A calculation was performed assuming the use of a membrane having a methane/nitrogen selectivity of 4. The stream numbers correspond to FIG. 3. The results of the calculations are summarized in Table 35.

TABLE 35

| | Stream | | | | | | | | |
|---|---|---|---|---|---|---|---|---|---|
| | 301 | 300 | 307 | 309 | 310 | 312 | 313 | 315 | 316 |
| Molar flow (lbmol/h) | 580 | 1,375 | 1,375 | 442 | 933 | 795 | 139 | 32.8 | 106 |
| Mass flow (lb/h) | 10,351 | 24,029 | 24,029 | 7,297 | 16,732 | 13,678 | 3,054 | 617 | 2,437 |
| Temp. (° C.) | 25 | 6 | 30 | 24 | 18 | −7 | −32 | −38 | −44 |
| Pressure (psia) | 300 | 300 | 1,500 | 100 | 1,500 | 300 | 1,500 | 50 | 1,500 |
| Component (mol %): | | | | | | | | | |
| Methane | 85.0 | 88.0 | 88.0 | 96.0 | 84.3 | 90.2 | 50.0 | 76.6 | 41.8 |
| Nitrogen | 15.0 | 12.0 | 12.0 | 4.0 | 15.7 | 9.8 | 50.0 | 23.4 | 58.2 |

Membrane area = 276 + 668 + 30 $m^2$
Theoretical horsepower = 1,034 hp

Example 37

Table 36 compares the compressor horsepower and membrane area requirements and the product recoveries of the processes at the varying membrane selectivities of Examples 33–36. As in Examples 28–31, the process was set to produce three streams: a pipeline quality natural gas product stream (309) containing 4% nitrogen; an engine fuel stream (315) containing no more than about 40% nitrogen; and are injection stream (316) containing more than 60% nitrogen. In all calculations, the process yields 3.8 MMscfd of pipeline quality gas, and achieved 86% methane recovery into that gas.

TABLE 36

| Example # | Methane/ Nitrogen Selectivity | Mernbrane Area ($m^2$) | Total Compressor Horsepower | Recycle Gas (lbmol/h) (Stream 312) | Fuel Gas Composition (%) (Stream 315) | | Reinjection Gas Composition (%) (Stream 316) | |
|---|---|---|---|---|---|---|---|---|
| | | | | | $CH_4$ | $N_2$ | $CH_4$ | $N_2$ |
| 33 | 2.5 | 4,123 | 4,253 | 5,247 | 68 | 32 | 43 | 57 |
| 34 | 3.0 | 2,121 | 2,053 | 2,297 | 72 | 28 | 43 | 57 |

TABLE 36-continued

| Example # | Methane/ Nitrogen Selectivity | Mernbrane Area (m²) | Total Compressor Horsepower | Recycle Gas (lbmol/h) (Stream 312) | Fuel Gas Composition (%) (Stream 315) | | Reinjection Gas Composition (%) (Stream 316) | |
|---|---|---|---|---|---|---|---|---|
| | | | | | CH₄ | N₂ | CH₄ | N₂ |
| 35 | 3.5 | 1,381 | 1,323 | 1,276 | 74 | 26 | 42 | 58 |
| 36 | 4.0 | 1,034 | 974 | 795 | 77 | 23 | 42 | 58 |

As was seen in Table 31 of Example 32, the membrane area requirement again decreases with increasing membrane selectivity. The volume flow of the recycle stream (312) also decreases with increasing membrane selectivity, with a resultant decrease in the compressor horsepower requirement.

Comparison of Tables 31 and 36 shows that the processes represented by the calculations summarized in Table 31 use about 20–30% more membrane area and 25–30% more compressor horsepower than those summarized in Table 36. Yet, comparison of the product yields shows that the processed represented by the calculations of Examples 28–31 achieve 4 MMscfd of pipeline quality natural gas and 90% methane recovery into that gas, whereas the processes represented by the calculations of Examples 33–36 achieve 3.8 MMscfd of pipeline quality natural gas and 86% methane recovery into that gas.

For these types of streams, it appears that it would not be cost-effective to invest in 20–30% greater equipment capacity for a proportionally small increase in gas yield and recovery. Similar trade-off calculations can be made for the other streams by those of skill in the art by following the teachings herein.

Example 38

Experimental Measurement of Effect of Feed Temperature on Silicone Rubber Membrane An experiment was carried out to determine the performance of membranes suitable for use in the invention at different temperatures. The membranes were silicone rubber composite membranes, prepared by dip-coating a microporous support in a dimethyl siloxane solution, then drying the membrane. The resulting 20μm-thick silicone rubber composite membrane was cut into 12.6-cm² stamps, and subjected to permeation tests in a permeation test cell apparatus at 200 psig feed pressure and three feed temperatures: −26° C., and −10° C., and 23° C. The low temperatures were obtained by immersing the test cell in a low-temperature recirculating chiller. The permeate side was maintained at atmospheric pressure.

The feed gas was a model natural gas mixture containing 87% methane, 10% nitrogen, and 3% propane. During each test, the feed, permeate, and residue compositions were analyzed by gas chromatography (GC). The pressure-normalized fluxes of propane, methane, and nitrogen, and the propane/nitrogen, propane/methane, and methane/nitrogen selectivities were calculated using an in-house computer program.

Figure 10:
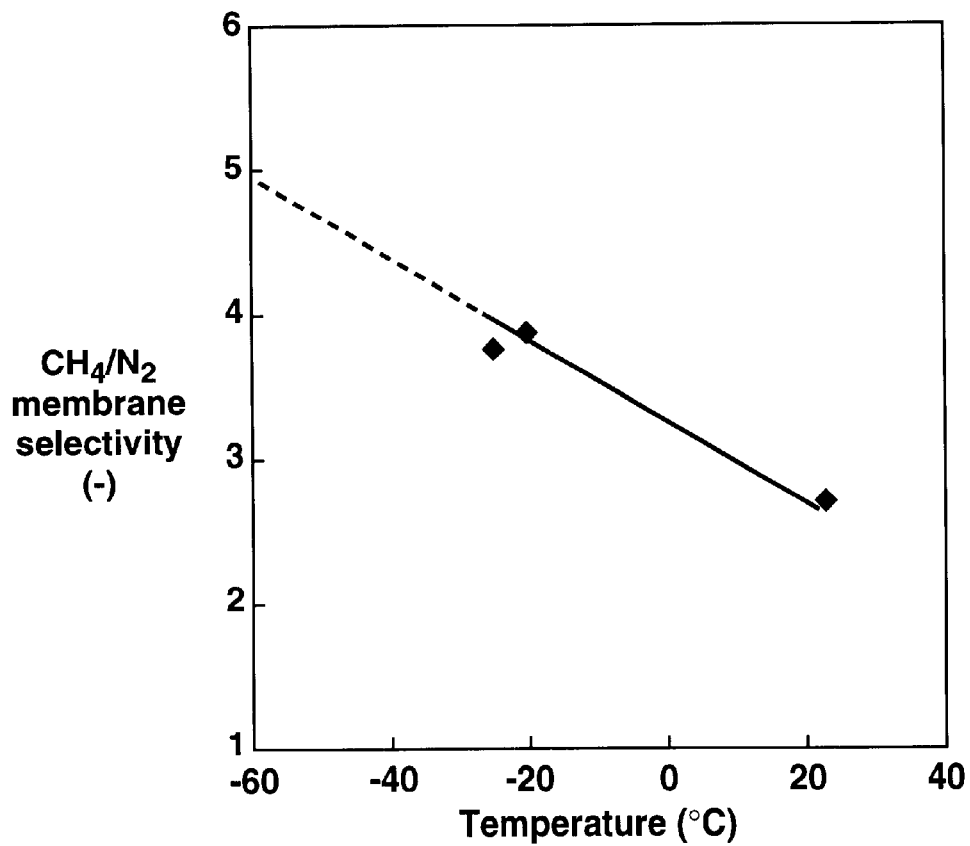
FIG. 10 is a graph of methane/nitrogen selectivity as a function of feed gas temperature for a laboratory membrane stamp permeation test with a model natural gas mixture.

The methane/nitrogen selectivity increased with decreasing temperature, from about 2.7 at 23° C., to about 4 at sub-ambient temperatures. As can be seen from FIG. 10, a selectivity of about 5 could be obtained at an operating temperature of about −60° C. This temperature is sufficiently above the glass-transition temperature of silicone rubber (−123° C.) that the selectivity is still increasing as temperature falls.

Example 39

Measurement of Effect of Temperature on Selectivity in the Field

A field test system was built to evaluate the ability of methane-selective membranes to operate when exposed to a real nitrogen-contaminated natural gas stream under field conditions. The system was operated in a gas field for six months. The field test system consisted of a single membrane separation step having a single 4-inch-diameter spiral-wound membrane module containing silicone rubber membranes. The unit was equipped with sampling ports in the membrane feed, residue, and permeate lines to enable gas bombs to be collected for off-site analysis. Gas flows and compositions were measured regularly.

The raw gas contained approximately 75% methane, 19% nitrogen, and the balance C₂₊ hydrocarbons. The module feed pressure varied from about 250 to 450 psia, and the feed temperature varied from about −12 to 22° C. The feed flow rate varied from about 10 to 30 scfm.

Figure 8:
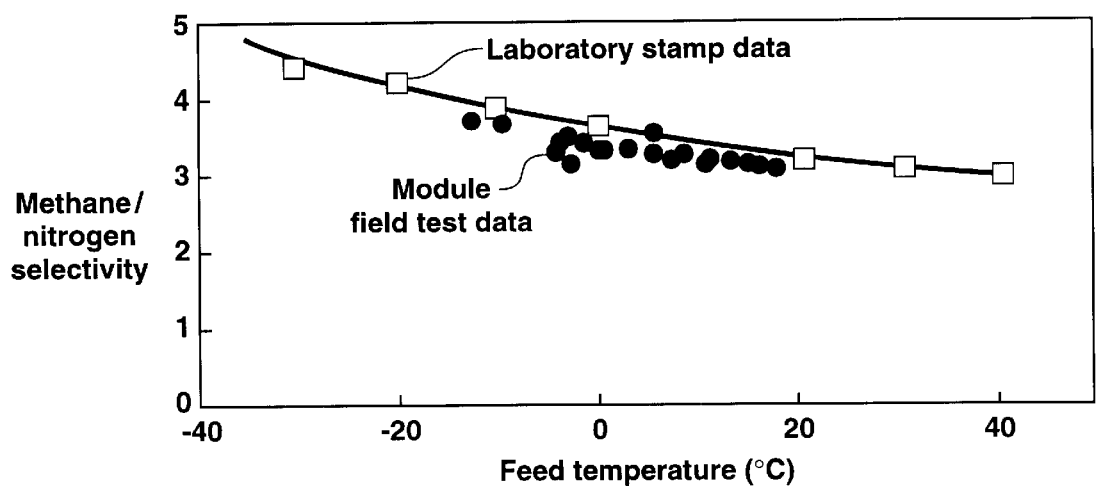
FIG. 8 is a graph of methane/nitrogen selectivity as a function of the temperature of the gas entering the membrane separation step for both a laboratory stamp test and a field test with one spiral-wound membrane module.

FIG. 8 plots data points for the membrane selectivity calculated from the field test flow and composition data. Also shown in FIG. 8 is a curve based on laboratory stamp data according to the procedure of Example 38, for a sample of the same membrane used in the field test module. As can be seen, there is good agreement between the laboratory and field test data. As expected, the selectivity increases with decreasing temperature.

We claim:

1. A process for removing nitrogen from a gas stream comprising methane and at least about 4% nitrogen, the process comprising the steps of:

(a) compressing the gas stream to a first pressure in the range 400–1,500 psia to form a compressed gas stream;

(b) providing a first membrane unit containing a first membrane having a first feed side and a first permeate side, the first membrane being more permeable to methane than to nitrogen;

(c) providing a second membrane unit containing a second membrane having a second feed side and a second permeate side, the second membrane being more permeable to methane than to nitrogen, the second membrane unit being connected in series with the first membrane unit such that gas leaving the first feed side can enter the second membrane unit on the second feed side;

(d) introducing the compressed gas stream at a first temperature higher than about −40° C. into the first membrane unit at a first inlet of the first feed side, and passing the compressed gas stream across the first feed side;

(e) withdrawing from a first outlet of the first feed side a first residue stream enriched in nitrogen compared with the gas stream;

(f) withdrawing from the first permeate side, at a second pressure lower than the first pressure and above about 25 psia, a first permeate stream depleted in nitrogen compared with the gas stream;

(g) introducing the first residue stream into the second membrane unit at a second inlet of the second feed side, and passing the first residue stream across the second feed side;

(h) withdrawing from a second outlet of the second feed side a second residue stream enriched in nitrogen compared with the first residue stream;

(i) withdrawing from the second permeate side, at a third pressure lower than the first pressure and above about 25 psia, a second permeate stream depleted in nitrogen compared with the first residue stream.

2. The process of claim 1, further comprising recirculating the second permeate stream to step (a).

3. The process of claim 2, wherein step (a) is carried out in a compressor having at least two stages, including at least a lower-pressure stage having a first inlet and a higher-pressure stage having a second inlet, and wherein the gas stream is introduced into step (a) on the second inlet side, and wherein the second permeate stream is introduced into step (a) on the first inlet side.

4. The process of claim 1, wherein the first pressure is in the range 500–1,200 psia.

5. The process of claim 1, wherein the second pressure and the third pressure are both at least about 100 psia.

6. The process of claim 1, wherein the second pressure and the third pressure are both at least about 200 psia.

7. The process of claim 1, wherein the compressed gas stream is cooled by heat exchange against at least one of the first and second permeate streams before step (d).

8. The process of claim 1, wherein the compressed gas stream is cooled to a temperature between about 20° C. and −25° C. before step (d).

9. The process of claim 1, wherein the compressed gas stream is cooled to a temperature between about 10° C. and −10° C. before step (d).

10. The process of claim 1, wherein the gas stream comprises natural gas.

11. The process of claim 1, wherein the gas stream contains at least about 10% nitrogen.

12. The process of claim 1, wherein the first membrane and the second membrane comprise silicone rubber.

13. The process of claim 1, further comprising passing the second residue stream to a third membrane separation step.

14. The process of claim 13, wherein the third membrane separation step comprises:

(j) providing a third membrane unit containing a third membrane having a third feed side and a third permeate side, the third membrane being more permeable to methane than to nitrogen, the third membrane unit being connected in series with the second membrane unit such that gas leaving the second feed side can enter the third membrane unit on the third feed side;

(k) introducing the second residue stream into the third membrane unit at a third inlet of the third feed side, and passing the second residue stream across the third feed side;

(l) withdrawing from a third outlet of the third feed side a third residue stream enriched in nitrogen compared with the second residue stream, and containing at least about 50% nitrogen;

(m) withdrawing from the third permeate side, at a fourth pressure lower than the first pressure and above about 25 psia, a third permeate stream depleted in nitrogen compared with the second residue stream, and containing no more than about 40% nitrogen.

15. The process of claim 1, wherein step (a) is the only compression step in the process.

16. The process of claim 1, wherein the gas stream further comprises at least one component selected from the group consisting of water, carbon dioxide and $C_{3+}$ hydrocarbons.

17. The process of claim 1, wherein the first permeate stream contains no more than about 6% nitrogen.

18. The process of claim 1, wherein the first permeate stream contains no more than about 4% nitrogen.

19. The process of claim 1, wherein the first permeate stream contains at least about 70% of the methane content of the gas stream.

20. The process of claim 1, wherein the second residue stream contains at least about 50% nitrogen.

21. The process of claim 1, wherein the second permeate stream contains no more than about 40% nitrogen.

22. The process of claim 1, wherein the ratio first pressure: second pressure is between about 3 and 10.

23. The process of claim 1, wherein the ratio first pressure:third pressure is between about 3 and 10.

24. The process of claim 1, wherein the first membrane exhibits a selectivity for methane over nitrogen, when in use in the process, of no greater than about 5.

25. A process for removing nitrogen from a gas stream comprising methane and at least about 4% nitrogen, the process comprising the steps of:

(a) providing a first membrane unit containing a first membrane having a first feed side and a first permeate side, the first membrane being more permeable to methane than to nitrogen;

(b) providing a second membrane unit containing a second membrane having a second feed side and a second permeate side, the second membrane being more permeable to methane than to nitrogen, the second membrane unit being connected in series with the first membrane unit such that gas leaving the first feed side can enter the second membrane unit on the second feed side;

(c) introducing the gas stream, at a first pressure of at least about 400 psia and a first temperature higher than about −40° C., into the first membrane unit at a first inlet of the first feed side, and passing the gas stream across the first feed side;

(d) withdrawing from a first outlet of the first feed side a first residue stream enriched in nitrogen compared with the gas stream;

(e) withdrawing from the first permeate side, at a second pressure lower than the first pressure and higher than about 25 psia, a first permeate stream depleted in nitrogen compared with the gas stream;

(f) introducing the first residue stream into the second membrane unit at a second inlet of the second feed side, and passing the first residue stream across the second feed side;

(g) withdrawing from a second outlet of the second feed side a second residue stream enriched in nitrogen compared with the first residue stream;

(h) withdrawing from the second permeate side, at a third pressure lower than the first pressure and above about 25 psia, a second permeate stream depleted in nitrogen compared with the first residue stream.

26. The process of claim 25, further comprising recompressing the second permeate stream and recirculating it to step (c).

27. The process of claim 25, wherein the first pressure is in the range 500–1,200 psia.

28. The process of claim 25, wherein the second pressure and the third pressure are both at least about 100 psia.

29. The process of claim 25, wherein the second pressure and the third pressure are both at least about 200 psia.

30. The process of claim 25, wherein the gas stream is cooled by heat exchange against at least one of the first and second permeate streams before step (c).

31. The process of claim 25, wherein the gas stream is cooled to a temperature between about 20° C. and −25° C. before step (c).

32. The process of claim 25, wherein the gas stream is cooled to a temperature between about 10° C. and −10° C. before step (c).

33. The process of claim 25, wherein the gas stream comprises natural gas.

34. The process of claim 25, wherein the gas stream contains at least about 10% nitrogen.

35. The process of claim 25, wherein the first membrane and the second membrane comprise silicone rubber.

36. The process of claim 25, further comprising passing the second residue stream to a third membrane separation step.

37. The process of claim 36, wherein the third membrane separation step comprises:
  (i) providing a third membrane unit containing a third membrane having a third feed side and a third permeate side, the third membrane being more permeable to methane than to nitrogen, the third membrane unit being connected in series with the second membrane unit such that gas leaving the second feed side can enter the third membrane unit on the third feed side;
  (j) introducing the second residue stream into the third membrane unit at a third inlet of the third feed side, and passing the second residue stream across the third feed side;
  (k) withdrawing from a third outlet of the third feed side a third residue stream enriched in nitrogen compared with the second residue stream, and containing at least about 50% nitrogen;
  (l) withdrawing from the third permeate side, at a fourth pressure lower than the first pressure and above about 25 psia, a third permeate stream depleted in nitrogen compared with the second residue stream, and containing no more than about 40% nitrogen.

38. The process of claim 25, wherein the gas stream further comprises at least one component selected from the group consisting of water, carbon dioxide and $C_{3+}$ hydrocarbons.

39. The process of claim 25, wherein the first permeate stream contains no more than about 6% nitrogen.

40. The process of claim 25, wherein the first permeate stream contains no more than about 4% nitrogen.

41. The process of claim 25, wherein the first permeate stream contains at least about 70% of the methane content of the gas stream.

42. The process of claim 25, wherein the second residue stream contains at least about 50% nitrogen.

43. The process of claim 25, wherein the second permeate stream contains no more than about 40% nitrogen.

44. The process of claim 25, wherein the ratio first pressure:second pressure is between about 3 and 10.

45. The process of claim 25, wherein the ratio first pressure:third pressure is between about 3 and 10.

46. The process of claim 25, wherein the first membrane exhibits a selectivity for methane over nitrogen, when in use in the process, of no greater than about 5.

47. The process of claim 25, wherein the gas stream is compressed before step (c).

48. A process for producing three streams of value from a gas stream comprising at least about 50% methane and at least about 4% nitrogen, the process comprising the following steps:
  (a) providing a first membrane unit containing a first membrane having a first feed side and a first permeate side, the first membrane being more permeable to methane than to nitrogen;
  (b) providing a second membrane unit containing a second membrane having a second feed side and a second permeate side, the second membrane being more permeable to methane than to nitrogen, the second membrane unit being connected in series with the first membrane unit such that gas leaving the first feed side can enter the second membrane unit on the second feed side;
  (c) introducing the gas stream, at a first pressure and a first temperature, into the first membrane unit at a first inlet of the first feed side, and passing the gas stream across the first feed side;
  (d) withdrawing from the first feed side a first residue stream enriched in nitrogen compared with the gas stream;
  (e) withdrawing from the first permeate side at a second pressure, as a first stream of value, a first permeate stream enriched in methane and depleted in nitrogen compared with the gas stream, and containing no more than about 6% nitrogen;
  (f) introducing the first residue stream into the second membrane unit at a second inlet of the second feed side, and passing the first residue stream across the second feed side;
  (g) withdrawing from the second permeate side at a third pressure, as a second stream of value, a second permeate stream enriched in methane and depleted in nitrogen compared with the first residue stream, and containing at least about 50% methane and no more than about 40% nitrogen;
  (h) withdrawing from the second feed side, as a third stream of value, a second residue stream enriched in nitrogen and depleted in methane compared with the first residue stream, and containing at least about 50% nitrogen and no more than about 50% methane.

49. The process of claim 48, wherein the first pressure is at least about 400 psia.

50. The process of claim 48, wherein the first pressure is in the range 500–1,200 psia.

51. The process of claim 48, wherein the second pressure and the third pressure are both at least about 100 psia.

52. The process of claim 48, wherein the second pressure and the third pressure are both at least about 200 psia.

53. The process of claim 48, wherein the gas stream is cooled by heat exchange against at least one of the first and second permeate streams before step (c).

54. The process of claim 48, wherein the gas stream is cooled to a temperature above −40° C. before step (c).

55. The process of claim 48, wherein the gas stream is cooled to a temperature between about 20° C. and −25° C. before step (c).

56. The process of claim 48, wherein the gas stream is cooled to a temperature between about 10° C. and −10° C. before step (c).

57. The process of claim 48, wherein the gas stream comprises natural gas.

58. The process of claim 48, wherein the gas stream contains at least about 10% nitrogen.

59. The process of claim 48, wherein the first permeate stream contains no more than about 4% nitrogen.

60. The process of claim 48, wherein the first permeate stream contains at least about 70% of the methane content of the gas stream.

61. The process of claim 48, wherein the second residue stream contains at least about 60% nitrogen.

62. The process of claim 48, wherein the second permeate stream contains no more than about 30% nitrogen.

63. A process for producing three streams of value from a gas stream comprising at least about 50% methane and at least about 4% nitrogen, the process comprising the following steps:

(a) providing a first membrane unit containing a first membrane having a first feed side and a first permeate side, the first membrane being more permeable to methane than to nitrogen;

(b) providing a second membrane unit containing a second membrane having a second feed side and a second permeate side, the second membrane being more permeable to methane than to nitrogen, the second membrane unit being connected in series with the first membrane unit such that gas leaving the first feed side can enter the second membrane unit on the second feed side;

(c) providing a third membrane unit containing a third membrane having a third feed side and a third permeate side, the third membrane being more permeable to methane than to nitrogen, the third membrane unit being connected in series with the second membrane unit such that gas leaving the second feed side can enter the third membrane unit on the third feed side;

(d) introducing the gas stream, at a first pressure and a first temperature, into the first membrane unit at a first inlet of the first feed side, and passing the gas stream across the first feed side;

(e) withdrawing from the first feed side a first residue stream enriched in nitrogen compared with the gas stream;

(f) withdrawing from the first permeate side at a second pressure, as a first stream of value, a first permeate stream enriched in methane and depleted in nitrogen compared with the gas stream, and containing no more than about 6% nitrogen;

(g) introducing the first residue stream into the second membrane unit at a second inlet of the second feed side, and passing the first residue stream across the second feed side;

(h) withdrawing from the second permeate side at a third pressure, a second permeate stream enriched in methane and depleted in nitrogen compared with the first residue stream, and recirculating the second permeate stream to step (d);

(i) withdrawing from the second feed side a second residue stream enriched in nitrogen and depleted in methane compared with the first residue stream;

(j) introducing the second residue stream into the third membrane unit at a third inlet of the third feed side, and passing the second residue stream across the third feed side;

(k) withdrawing from the third permeate side, as a second stream of value, at a fourth pressure, a third permeate stream enriched in methane and depleted in nitrogen compared with the second residue stream, and containing at least about 50% methane and no more than about 40% nitrogen;

(l) withdrawing from the third feed side, as a third stream of value, a third residue stream enriched in nitrogen and depleted in methane compared with the second residue stream, and containing at least about 50% nitrogen and no more than about 50% methane.

64. The process of claim 63, wherein the first pressure is at least about 400 psia.

65. The process of claim 63, wherein the first pressure is in the range 500–1,200 psia.

66. The process of claim 63, wherein the second and third pressure are both at least about 100 psia.

67. The process of claim 63, wherein the second pressure and the third pressure are both at least about 200 psia.

68. The process of claim 63, wherein the fourth pressure is at least about 50 psia.

69. The process of claim 63, wherein the gas stream is cooled to a temperature above −40° C. before step (d).

70. The process of claim 63, wherein the gas stream is cooled to a temperature between about 20° C. and −25° C. before step (d).

71. The process of claim 63, wherein the gas stream is cooled to a temperature between about 10° C. and −10° C. before step (d).

72. The process of claim 63, wherein the gas stream comprises natural gas.

73. The process of claim 63, wherein the gas stream contains at least about 10% nitrogen.

74. The process of claim 63, wherein the first permeate stream contains no more than about 4% nitrogen.

75. The process of claim 63, wherein the first permeate stream contains at least about 70% of the methane content of the gas stream.

76. The process of claim 63, wherein the third residue stream contains at least about 60% nitrogen.

77. The process of claim 63, wherein the third permeate stream contains no more than about 30% nitrogen.

* * * * *